US00RE43149E

(19) United States
(12) Reissued Patent
Bybell et al.

(10) Patent Number: US RE43,149 E
(45) Date of Reissued Patent: Jan. 31, 2012

(54) METHOD FOR GENERATING A HALFTONE OF A SOURCE IMAGE

(75) Inventors: Daniel P. Bybell, Medford, MA (US); Jay E. Thornton, Watertown, MA (US); Dana F. Schuh, Windham, NH (US)

(73) Assignee: Senshin Capital, LLC, Wilmington, DE (US)

(21) Appl. No.: 12/031,151

(22) Filed: Feb. 14, 2008 (Under 37 CFR 1.47)

Related U.S. Patent Documents

Reissue of:
(64) Patent No.: 6,999,202
Issued: Feb. 14, 2006
Appl. No.: 09/817,932
Filed: Mar. 27, 2001

(51) Int. Cl.
*G06K 15/00* (2006.01)
*H04N 1/405* (2006.01)

(52) U.S. Cl. ..... 358/3.06; 358/3.13

(58) Field of Classification Search ..... 358/3.06, 358/535, 536, 534, 3.18, 3.17, 3.16, 3.15, 358/3.14, 3.13
See application file for complete search history.

(56) References Cited

U.S. PATENT DOCUMENTS

| | | | |
|---|---|---|---|
| 3,820,133 | A | 6/1974 | Adorney et al. |
| 3,864,708 | A | 2/1975 | Allen |
| 4,070,587 | A | 1/1978 | Hanakata |
| 4,072,973 | A | 2/1978 | Mayo |
| 4,089,017 | A | 5/1978 | Buldini |
| 4,154,523 | A | 5/1979 | Rising et al. |
| 4,168,120 | A | 9/1979 | Freier et al. |
| 4,284,876 | A | 8/1981 | Ishibashi et al. |
| 4,309,712 | A | 1/1982 | Iwakura |
| 4,347,518 | A | 8/1982 | Williams et al. |
| 4,364,063 | A | 12/1982 | Anno et al. |
| 4,385,302 | A | 5/1983 | Morigichi et al. |
| 4,391,535 | A | 7/1983 | Palmer |
| 4,415,908 | A | 11/1983 | Sugiura |
| 4,443,121 | A | 4/1984 | Arai |
| 4,447,818 | A | 5/1984 | Kurata et al. |
| 4,464,669 | A | 8/1984 | Sekiya et al. |

(Continued)

FOREIGN PATENT DOCUMENTS

EP 0 619 188 10/1994

(Continued)

OTHER PUBLICATIONS

Digital Halftoning, Robert Ulichney, Cambridge, MA, The MIT Press (1987), ISBN, 0-262-21009-6, Chapter 5 and 6.

(Continued)

*Primary Examiner* — Thomas D Lee
(74) *Attorney, Agent, or Firm* — Woodcock Washburn LLP

(57) ABSTRACT

In one aspect of the present invention, a method is provided for producing a halftone of a source image. The halftone includes halftone pixels. The halftone pixels are suitable for containing halftone dots. The method selects glyphs corresponding to intensities of regions (e.g., pixels) in the source image. The glyphs contain one or more halftone dots. The method locates halftone dots within the halftone pixels such that for at least one pair of halftone dots contained within a pair of halftone pixels sharing a common boundary, the halftone dots in the pair of halftone pixels extend in opposite directions from the common boundary.

49 Claims, 27 Drawing Sheets

U.S. PATENT DOCUMENTS

| | | | | |
|---|---|---|---|---|
| 4,514,738 | A | | 4/1985 | Nagato et al. |
| 4,524,368 | A | | 6/1985 | Inui et al. |
| 4,540,992 | A | | 9/1985 | Moteki et al. |
| 4,563,691 | A | | 1/1986 | Noguchi et al. |
| 4,607,262 | A | | 8/1986 | Moriguchi et al. |
| 4,638,372 | A | | 1/1987 | Leng et al. |
| 4,686,549 | A | | 8/1987 | Williams et al. |
| 4,688,051 | A | | 8/1987 | Kawakami et al. |
| 4,738,526 | A | | 4/1988 | Larish |
| 4,739,344 | A | | 4/1988 | Sullivan et al. |
| 4,777,496 | A | | 10/1988 | Maejima et al. |
| 4,805,033 | A | | 2/1989 | Nishikawa |
| 4,809,063 | A | | 2/1989 | Moriguchi et al. |
| 4,884,080 | A | | 11/1989 | Hirahara et al. |
| 4,933,709 | A | | 6/1990 | Manico et al. |
| 4,962,403 | A | | 10/1990 | Goodwin et al. |
| 5,006,866 | A | | 4/1991 | Someya |
| 5,045,952 | A | | 9/1991 | Eschbach |
| 5,046,118 | A | | 9/1991 | Ajewole et al. |
| 5,066,961 | A | | 11/1991 | Yamashita |
| 5,086,306 | A | | 2/1992 | Sasaki |
| 5,086,484 | A | | 2/1992 | Katayama et al. |
| 5,109,235 | A | | 4/1992 | Sasaki |
| 5,115,252 | A | | 5/1992 | Sasaki |
| 5,130,821 | A | * | 7/1992 | Ng ..... 358/3.15 |
| 5,132,703 | A | | 7/1992 | Nakayama |
| 5,132,709 | A | | 7/1992 | West |
| 5,162,813 | A | | 11/1992 | Kuroiwa et al. |
| 5,184,150 | A | | 2/1993 | Sugimoto |
| 5,208,684 | A | | 5/1993 | Itoh |
| 5,244,861 | A | | 9/1993 | Campbell et al. |
| 5,248,995 | A | | 9/1993 | Izumi |
| 5,268,706 | A | | 12/1993 | Sakamoto |
| 5,285,220 | A | | 2/1994 | Suzuki et al. |
| 5,307,425 | A | | 4/1994 | Otsuka |
| 5,323,245 | A | | 6/1994 | Rylander ..... 358/536 |
| 5,333,246 | A | | 7/1994 | Nagasaka |
| 5,422,662 | A | | 6/1995 | Fukushima et al. |
| 5,450,099 | A | | 9/1995 | Stephenson et al. |
| 5,469,203 | A | | 11/1995 | Hauschild |
| 5,479,263 | A | | 12/1995 | Jacobs et al. ..... 358/298 |
| 5,497,174 | A | | 3/1996 | Stephany et al. |
| 5,521,626 | A | | 5/1996 | Tanaka et al. |
| 5,539,443 | A | | 7/1996 | Mushika et al. |
| 5,569,347 | A | | 10/1996 | Obata et al. |
| 5,576,745 | A | | 11/1996 | Matsubara |
| 5,602,653 | A | | 2/1997 | Curry ..... 358/454 |
| 5,617,223 | A | | 4/1997 | Burns et al. |
| 5,623,297 | A | | 4/1997 | Austin et al. |
| 5,623,581 | A | | 4/1997 | Attenberg |
| 5,625,399 | A | | 4/1997 | Wiklof et al. |
| 5,642,148 | A | | 6/1997 | Fukushima et al. |
| 5,644,351 | A | | 7/1997 | Matsumoto et al. |
| 5,646,672 | A | | 7/1997 | Fukushima |
| 5,664,253 | A | | 9/1997 | Meyers |
| 5,668,638 | A | | 9/1997 | Knox |
| 5,694,484 | A | | 12/1997 | Cottrell et al. |
| 5,703,644 | A | | 12/1997 | Mori et al. |
| 5,706,044 | A | | 1/1998 | Fukushima |
| 5,707,082 | A | | 1/1998 | Murphy |
| 5,711,620 | A | | 1/1998 | Sasaki et al. |
| 5,719,615 | A | | 2/1998 | Hashiguchi et al. |
| 5,721,578 | A | | 2/1998 | Nakai et al. |
| 5,724,456 | A | | 3/1998 | Boyack et al. |
| 5,729,274 | A | | 3/1998 | Sato |
| 5,757,976 | A | | 5/1998 | Shu |
| 5,777,599 | A | | 7/1998 | Poduska, Jr. ..... 345/136 |
| 5,781,315 | A | | 7/1998 | Yamaguchi |
| 5,784,092 | A | | 7/1998 | Fukuoka |
| 5,786,837 | A | | 7/1998 | Kaerts et al. |
| 5,786,900 | A | | 7/1998 | Sawano |
| 5,800,075 | A | | 9/1998 | Katsuma et al. |
| 5,808,653 | A | | 9/1998 | Matsumoto et al. |
| 5,809,164 | A | | 9/1998 | Hultgren, III |
| 5,809,177 | A | | 9/1998 | Metcalfe et al. |
| 5,818,474 | A | | 10/1998 | Takahashi et al. |
| 5,818,975 | A | | 10/1998 | Goodwin et al. |
| 5,835,244 | A | | 11/1998 | Bestmann |
| 5,835,627 | A | | 11/1998 | Higgins et al. |
| 5,841,461 | A | | 11/1998 | Katsuma |
| 5,859,711 | A | | 1/1999 | Barry et al. |
| 5,880,777 | A | | 3/1999 | Savoye et al. |
| 5,889,546 | A | | 3/1999 | Fukuoka |
| 5,897,254 | A | | 4/1999 | Tanaka et al. |
| 5,913,019 | A | | 6/1999 | Attenberg |
| 5,956,067 | A | | 9/1999 | Isono et al. |
| 5,956,421 | A | | 9/1999 | Tanaka et al. ..... 382/172 |
| 5,970,224 | A | | 10/1999 | Salgado et al. |
| 5,978,106 | A | | 11/1999 | Hayashi |
| 5,995,654 | A | | 11/1999 | Buhr et al. |
| 5,999,204 | A | | 12/1999 | Kojima |
| 6,005,596 | A | | 12/1999 | Yoshida et al. |
| 6,028,957 | A | | 2/2000 | Katori et al. |
| 6,069,982 | A | | 5/2000 | Reuman |
| 6,104,421 | A | | 8/2000 | Iga et al. |
| 6,104,468 | A | | 8/2000 | Bryniarski et al. |
| 6,104,502 | A | | 8/2000 | Shiomi ..... 358/1.9 |
| 6,106,173 | A | | 8/2000 | Suzuki et al. |
| 6,108,105 | A | | 8/2000 | Takeuchi et al. ..... 358/455 |
| 6,128,099 | A | | 10/2000 | Delabastia ..... 358/1.9 |
| 6,128,415 | A | | 10/2000 | Hultgren, III et al. |
| 6,133,983 | A | | 10/2000 | Wheeler |
| 6,157,459 | A | | 12/2000 | Shiota et al. |
| 6,172,768 | B1 | | 1/2001 | Yamada et al. |
| 6,186,683 | B1 | | 2/2001 | Shibuki |
| 6,204,940 | B1 | | 3/2001 | Lin et al. |
| 6,208,429 | B1 | | 3/2001 | Anderson |
| 6,226,021 | B1 | | 5/2001 | Kobayashi et al. |
| 6,233,360 | B1 | | 5/2001 | Metcalfe et al. |
| 6,243,133 | B1 | | 6/2001 | Spaulding et al. |
| 6,263,091 | B1 | | 7/2001 | Jain et al. |
| 6,282,317 | B1 | | 8/2001 | Luo et al. |
| 6,293,651 | B1 | | 9/2001 | Sawano |
| 6,402,283 | B2 | | 6/2002 | Schulte |
| 6,425,699 | B1 | | 7/2002 | Doval et al. |
| 6,447,186 | B1 | | 9/2002 | Oguchi et al. |
| 6,456,388 | B1 | | 9/2002 | Inoue et al. |
| 6,462,835 | B1 | | 10/2002 | Loushin et al. |
| 6,501,566 | B1 | | 12/2002 | Ishiguro et al. |
| 6,537,410 | B2 | | 3/2003 | Arnost et al. |
| 6,563,945 | B2 | | 5/2003 | Holm |
| 6,567,111 | B2 | | 5/2003 | Kojima et al. |
| 6,577,751 | B2 | | 6/2003 | Yamamoto |
| 6,583,852 | B2 | | 6/2003 | Baum et al. |
| 6,608,926 | B1 | | 8/2003 | Suwa |
| 6,614,459 | B2 | | 9/2003 | Fujimoto et al. |
| 6,628,417 | B1 | | 9/2003 | Naito et al. |
| 6,628,823 | B1 | | 9/2003 | Holm |
| 6,628,826 | B1 | | 9/2003 | Gilman et al. |
| 6,628,899 | B1 | | 9/2003 | Kito |
| 6,650,771 | B1 | | 11/2003 | Walker |
| 6,661,443 | B2 | | 12/2003 | Bybell et al. |
| 6,671,063 | B1 | | 12/2003 | Iida |
| 6,690,488 | B1 | | 2/2004 | Reuman |
| 6,694,051 | B1 | | 2/2004 | Yamazoe et al. |
| 6,711,285 | B2 | | 3/2004 | Noguchi |
| 6,760,489 | B1 | | 7/2004 | Kuwata |
| 6,762,855 | B1 | | 7/2004 | Goldberg et al. |
| 6,819,347 | B2 | | 11/2004 | Saquib et al. |
| 6,826,310 | B2 | | 11/2004 | Trifonov et al. |
| 6,842,186 | B2 | | 1/2005 | Bouchard et al. |
| 6,906,736 | B2 | | 6/2005 | Bouchard et al. |
| 6,937,365 | B2 | | 8/2005 | Gorian et al. |
| 6,956,967 | B2 | | 10/2005 | Gindele et al. |
| 6,999,202 | B2 | | 2/2006 | Bybell et al. |
| 7,050,194 | B1 | | 5/2006 | Someno et al. |
| 7,092,116 | B2 | | 8/2006 | Calaway |
| 7,127,108 | B2 | | 10/2006 | Kinjo et al. |
| 7,129,980 | B1 | | 10/2006 | Ashida |
| 7,154,621 | B2 | | 12/2006 | Rodriguez et al. |
| 7,154,630 | B1 | | 12/2006 | Nimura et al. |
| 7,167,597 | B2 | | 1/2007 | Matsushima |
| 7,200,265 | B2 | | 4/2007 | Imai |
| 7,224,476 | B2 | | 5/2007 | Yoshida |
| 7,260,637 | B2 | | 8/2007 | Kato |
| 7,272,390 | B1 | | 9/2007 | Adachi et al. |
| 7,283,666 | B2 | | 10/2007 | Saquib |

| | | | |
|---|---|---|---|
| 7,336,775 | B2 | 2/2008 | Tanaka et al. |
| 7,355,732 | B2 | 4/2008 | Yamaguchi |
| 7,548,260 | B2 | 6/2009 | Yamaguchi |
| 7,557,950 | B2 | 7/2009 | Hatta et al. |
| 2003/0021478 | A1 | 1/2003 | Yoshida |
| 2004/0073783 | A1 | 4/2004 | Ritchie |
| 2004/0179226 | A1 | 9/2004 | Burkes et al. |
| 2004/0207712 | A1 | 10/2004 | Bouchard et al. |
| 2005/0005061 | A1 | 1/2005 | Robins |
| 2005/0219344 | A1 | 10/2005 | Bouchard |
| 2007/0036457 | A1 | 2/2007 | Saquib |
| 2009/0128613 | A1 | 5/2009 | Bouchard et al. |

FOREIGN PATENT DOCUMENTS

| | | |
|---|---|---|
| EP | 0 625 425 | 11/1994 |
| EP | 0 626 611 | 11/1994 |
| EP | 0 454 495 | 7/1996 |
| EP | 0 791 472 | 2/1997 |
| EP | 0 762 736 | 3/1997 |
| EP | 0 773 470 | 5/1997 |
| EP | 0 939 359 | 9/1999 |
| EP | 1 004 442 | 5/2000 |
| EP | 1 056 272 | 11/2000 |
| EP | 1 078 750 | 2/2001 |
| EP | 1 137 247 | 9/2001 |
| EP | 1 201 449 | 10/2001 |
| EP | 0 204 094 | 7/2003 |
| EP | 1 392 514 | 9/2005 |
| EP | 0 933 679 | 4/2008 |
| GB | 2 356 375 | 5/2001 |
| JP | 58-164368 | 9/1983 |
| JP | 59-127781 | 7/1984 |
| JP | 01 040371 | 2/1989 |
| JP | 02-248264 | 10/1990 |
| JP | 02-289368 | 11/1990 |
| JP | 03-024972 | 2/1991 |
| JP | 4-119338 | 4/1992 |
| JP | 06 183033 | 7/1994 |
| JP | 06 266514 | 9/1994 |
| JP | 6-308632 | 11/1994 |
| JP | 9-138465 | 5/1997 |
| JP | 09167129 | 6/1997 |
| JP | 2000-050077 | 2/2000 |
| JP | 2000-050080 | 2/2000 |
| JP | 2000-184270 | 6/2000 |
| JP | 2001-160908 | 6/2001 |
| JP | 2001-273112 | 10/2001 |
| JP | 2003-008986 | 1/2003 |
| KR | 2001-0037684 | 5/2001 |
| WO | WO 99 53415 | 10/1999 |
| WO | WO 00/04492 | 1/2000 |
| WO | WO 01/01669 | 1/2001 |
| WO | WO 01 31432 | 5/2001 |
| WO | WO 02 078320 | 10/2002 |
| WO | WO 02/096651 | 12/2002 |
| WO | WO 03/071780 | 8/2003 |
| WO | WO 2004/077816 | 9/2004 |
| WO | WO 2005 006200 | 1/2005 |

OTHER PUBLICATIONS

Bhukhanwala et al., "Automated Global Enhancement of Digitalized Photographs," IEEE Transactions on Consumer Electronics, Feb. 1994.

Damera-Venkata et al., "Adaptive Threshold Modulation for Error Diffusion Halftoning," IEEE Trans. On Image Processing, 2001, 10(1), 104-116.

Gonzalez et al., "Digital Image Processing," Addison-Wesley, 1977, 119-126.

Hann, R.A. et al., "Chemical Technology in Printing and Imaging Systems", *The Royal Society of Chemistry, , Special Publication*. 133 (1993), pp. 73-85.

Hann, R.A. et al., "Dye Diffusion Thermal Transfer (D2T2) Color Printing", *Journal of Imaging Technology*, 16 (6). (1990), pp. 238-241.

Kearns et al., "Algorithmic Stability and Sanity-Check Bounds for Leave-One-Out Cross-Validation," XP-002299710, Jan. 1997, 1-20.

Knox et al., "Threshold Modulation in Error Diffusion," SPIE, 1993, 2(3), 185-192.

Taguchi et al., "New Thermal Offset Printing Employing Dye Transfer Technology (Tandem TOP-D)," *NIP17: International Conference on Digital Printing Technologies*, Sep. 2001, vol. 17, pp. 499-503.

Pratt, W.K., "Digital Image Processing," Wiley & Sons, 1978, 311-318.

Weston et al., "Adaptive Margin Support Vector Machines," Advances in Large Margin Classifiers, 2000, 281-296.

Wong, P.W., "Adaptive Error Diffusion and Its Application in Multiresolution Rendering," IEEE Trans. On Image Processing, 1996, 5(7), 1184-1196.

United States Patent and Trademark Office: Restriction Requirement dated Sep. 30, 2003, U.S. Appl. No. 10/078,644, filed Feb. 19, 2002.

United States Patent and Trademark Office: Restriction Requirement dated Oct. 2, 2003, U.S. Appl. No. 10/080,883, filed Feb. 2, 2002.

United States Patent and Trademark Office: Non-Final Office Action dated Mar. 29, 2004, U.S. Appl. No. 10/080,883, filed Feb. 22, 2002.

United States Patent and Trademark Office: Non-Final Office Action dated Sep. 22, 2004, U.S. Appl. No. 10/078,644, filed Feb. 19, 2002.

United States Patent and Trademark Office: Notice of Allowance dated Sep. 23, 2004, U.S. Appl. No. 10/080,883, filed Feb. 22, 2003.

United States Patent and Trademark Office: Non-Final Office Action dated Nov. 29, 2004, U.S. Appl. No. 09/817,932, filed Mar. 27, 2001.

United States Patent and Trademark Office: Non-Final Office Action dated Nov. 29, 2004, U.S. Appl. No. 09/870,537, filed May 30, 2001.

United States Patent and Trademark Office: Notice of Allowance dated Feb. 22, 2005, U.S. Appl. No. 10/078,644, filed Feb. 19, 2002.

United States Patent and Trademark Office: Notice of Allowance dated May 9, 2005, U.S. Appl. No. 09/870,537, filed May 30, 2001.

United States Patent and Trademark Office: Notice of Allowance dated Aug. 31, 2005, U.S. Appl. No. 09/817,932, filed Mar. 27, 2001.

United States Patent and Trademark Office: Non-Final Office Action dated Jul. 13, 2006, U.S. Appl. No. 10/375,440, filed Feb. 27, 2003.

United States Patent and Trademark Office: Final Office Action dated Dec. 4, 2006, U.S. App. No. 10/375,440, filed Feb. 27, 2003.

United States Patent and Trademark Office: Notice of Allowance dated May 29, 2007, U.S. Appl. No. 10/375,440, filed Feb. 27, 2003.

United States Patent and Trademark Office: Restriction Requirement dated Jun. 29, 2007, U.S. Appl. No. 10/611,737, filed Jul. 1, 2003.

United States Patent and Trademark Office: Restriction Requirement dated Sep. 4, 2007, U.S. Appl. No. 10/844,286, filed May 12, 2004.

United States Patent and Trademark Office: Notice of Allowance dated Sep. 6, 2007, U.S. Appl. No. 10/375,440, filed Feb. 27, 2003.

United States Patent and Trademark Office: Non-Final Office Action dated Oct. 4, 2007, U.S. Appl. No. 10/611,737, filed Jul. 1, 2003.

United States Patent and Trademark Office: Non-Final Office Action dated Nov. 14, 2007, U.S. Appl. No. 10/844,286, filed May 12, 2004.

United States Patent and Trademark Office: Non-Final Office Action dated Mar. 20, 2008, U.S. Appl. No. 10/844,286, filed May 12, 2005.

United States Patent and Trademark Office: Non-Final Office Action dated Jun. 18, 2008, U.S. Appl. No. 10/611,737, filed Jul. 1, 2003.

United States Patent and Trademark Office: Final Office Action dated Sep. 12, 2008, U.S. Appl. No. 10/844,286, filed May 12, 2004.

United States Patent and Trademark Office: Restriction Requirement dated Oct. 8, 2008, U.S. Appl. No. 11/546,633, filed Oct. 12, 2006.

United States Patent and Trademark Office: Final Office Action dated Jan. 28, 2009, U.S. Appl. No. 10/611,737, filed Jul. 1, 2003.

United States Patent and Trademark Office: Non-Final Office Action dated Jan. 30, 2009, U.S. Appl. No. 11/546,633, filed Oct. 12, 2006.

United States Patent and Trademark Office: Non-Final Office Action dated May 21, 2009, U.S. Appl. No. 10/844,286, filed May 12, 2004.

United States Patent and Trademark Office: Restriction Requirement dated May 26, 2009, U.S. Appl. No. 11/546,633, filed Oct. 12, 2006.

United States Patent and Trademark Office: Non-Final Office Action dated Jun. 10, 2009, U.S. Appl. No. 10/611,737, filed Jul. 1, 2003.

United States Patent and Trademark Office: Final Office Action dated Jul. 9, 2009, U.S. Appl. No. 11/546,633, filed Oct. 12, 2006.

United States Patent and Trademark Office: U.S. Appl. No. 11/847,894, filed Aug. 30, 2007, Gorian et al.

International Preliminary Examination Report (IPER) dated Jun. 30, 2003, PCT/US02/015546.

EP Communication issued by the Examining Division Apr. 2, 2004, EP1392514.
International Preliminary Examination Report (IPER) issued Sep. 2, 2005, PCT/US04/004964.
EP Communication issued by the Examining Division Jan. 11, 2006, EP1597911.
EP Communication issued by the Examining Division May 23, 2006, EP1597911.
International Preliminary Examination Report (IPER) issued Jan. 3, 2006, PCT/US04/020981.
International Preliminary Examination Report (IPER) dated Sep. 17, 2003, PCT/US02/015913.
EP Communication issued by the Examining Division May 29, 2009, EP1479220.
International Preliminary Examination Report (IPER) dated Jan. 29, 2003, PCT/US02/008954.
EP Communication issued by the Examining Division Jul. 7, 2009, EP1374557.

* cited by examiner

METHOD FOR GENERATING A HALFTONE OF A SOURCE IMAGE

Matter enclosed in heavy brackets [ ] appears in the original patent but forms no part of this reissue specification; matter printed in italics indicates the additions made by reissue.

BACKGROUND

1. Field of the Invention

The present invention relates to digital halftoning and, more particularly, to retaining high-frequency details and reducing visual artifacts in digitally-halftoned images.

2. Related Art

It is often desirable to reproduce a continuous-tone image, such as a black-and-white or color photograph, using an output device that is only capable of producing a discrete set of tones. For example, it has become increasingly desirable to reproduce continuous-tone images using bilevel output devices, such as laser printers and some types of thermal-transfer printers, that are only capable of printing black ink or toner on a page.

Discrete-tone output devices typically simulate continuous-tone images by producing a halftone of the continuous-tone image. Halftones use patterns of dots to simulate various tones. Such dot patterns tend to approximate the appearance of continuous tones when viewed by the human eye from a suitable distance.

With conventional halftoning techniques, there is typically a tradeoff between the spatial resolution (the number of pixels within a given area) and the intensity resolution (the number of tones that may be simulated) of the halftone. The higher the spatial resolution, the lower the intensity resolution, and vice versa. Furthermore, halftones may exhibit visual artifacts, such as Moiré patterns, that reduce the perceived quality of the halftone.

What is needed, therefore, are improved techniques for performing digital halftoning that preserve high-frequency details with less of an impact on intensity resolution than conventional halftoning techniques. What is also needed are techniques for reducing the appearance of visual artifacts in digital halftones.

SUMMARY

In one aspect of the present invention, a method is provided for producing a halftone of a source image. The halftone includes halftone pixels. The halftone pixels are suitable for containing halftone dots. The method selects glyphs corresponding to intensities of regions (e.g., pixels) in the source image. The glyphs contain one or more halftone dots. The method locates halftone dots within the halftone pixels such that for at least one pair of halftone dots contained within a pair of halftone pixels sharing a common boundary, the halftone dots in the pair of halftone pixels extend in opposite directions from the common boundary.

Halftones produced by this method contain pairs of adjacent halftone dots that share a common pixel boundary. Such adjacent pairs of dots are referred to herein as dot pairs. In one embodiment of the present invention, each dot pair may be rendered by an output device as a single contiguous mark. For example, when rendered using a thermal printer, a dot pair may be rendered on an output medium as a single contiguous mark by printing one or more connected spots to form the dot pair. This technique results in fewer, larger dots being printed, thereby increasing the average dot perimeter-to-area ratio, which results in higher dot quality.

In a further embodiment of the present invention, the size of each dot in a dot pair is independently determined by the intensity of a unique region (e.g., a pixel) in the source image. This technique may result in greater retention of high-frequency detail than techniques that use a combination (e.g., average or sum) of multiple source image region intensities to determine the size of halftone dots.

As described above, halftone dots generated by the method described above abut halftone pixel boundaries. Such a method may advantageously be used to produce higher quality halftones than those produced by methods that use dots that are centered at pixel centers. By rendering each pair of adjacent dots as a single contiguous mark, larger dots are produced which are more robust and less susceptible to process variation that manifests itself as grain. This allows a greater number of tones to be simulated by the halftone, thereby resulting in higher-quality halftones.

The method described above may be used to produce halftones in which halftone dots are arranged according to various angles that reduce the presence of certain visual artifacts. For example, in one embodiment of the present invention, dots are arranged according to a 45-degree pattern, and according to a further embodiment of the present invention, spots are arranged according to a 38-degree pattern.

In one embodiment of the present invention, each halftone dot in the halftone corresponds to the intensity of a region (e.g., a single pixel) in the source image. In another embodiment of the present invention, a family of glyphs is used to generate dots in the halftone. Each of the glyphs corresponds to a range of intensities. For each region in the source image, the glyph corresponding to the intensity of the region is selected, and the dots in the glyph are generated in the halftone at coordinates corresponding to those of the source image region.

In yet a further embodiment of the present invention, the intensity of each source image region is used to select the glyph corresponding to the intensity. A dot within the glyph is selected based on the coordinates of the source image region, and the dot is generated in the halftone at the coordinates of the source image region.

Additional aspects and embodiments of the present invention will be described in more detail below.

DETAILED DESCRIPTION OF THE DRAWINGS

Before describing various embodiments of the present invention, certain terms will be defined.

Figure 8A:
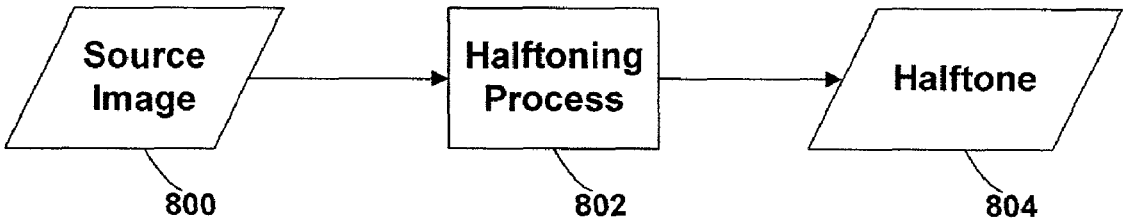
FIG. 8A is a block diagram of a halftoning system according to one embodiment of the present invention.

Source image. As used herein, the term "source image" refers to any continuous-tone or discrete-tone image for which a halftone is to be generated. For example, referring to FIG. 8A, a general halftoning system is shown. As shown in FIG. 8A, a source image 800 is provided as an input to a halftoning process 802, which produces a halftone 804 corresponding to the source image 800. Various embodiments of the source image 800, the halftoning process 802, and the halftone 804 are described in more detail below. The source image 800 may, for example, be a multitone digital image stored in a computer memory or on a computer-readable medium.

Halftone. As used herein, the term "halftone image"(or simply "halftone") refers to a discrete-tone image that simulates the appearance of a continuous-tone or discrete-tone source image using fewer tones than the source image. In one embodiment, a halftone consists of a two-dimensional array of halftone cells, each of which consists of a two-dimensional array of halftone pixels. As described in more detail below, a halftone pixel may contain one or more halftone dots, and a halftone dot may consist of one or more spots.

Halftone cell. As used herein, the term "halftone cell" refers to a collection of halftone pixels, such as a two-dimensional array of halftone pixels. A halftone cell may, for example, contain a glyph or halftone pixels containing any other collection of halftone dots. A halftone cell is the smallest unit of a halftone that is capable of containing any glyph in the family of glyphs used in the halftone.

Glyph. As used herein, the term "glyph" refers to a pattern consisting of one or more halftone dots. A particular halftone typically uses a collection of glyphs, referred to herein as a "family" of glyphs, to simulate various tones. A glyph in a digital halftone is typically a two-dimensional array of halftone pixels containing halftone dots, and as used herein, the term glyph may refer to a single halftone dot.

Pixel. An abbreviation for "picture element," a pixel is the smallest spatial unit of a digital image. A digital image is composed of a collection of pixels typically arranged in a rectangular array. Each pixel has a location, typically expressed in terms of x (column) and y (row) coordinates, and an intensity, which may represent any tone such as a color or a shade of gray. Pixels typically adjoin each other when rendered on various output media, although they may overlap or be spaced apart to various degrees when rendered. Various well-known techniques have been developed for representing the locations and tones of pixels.

As described herein, the source image 800 may be a digital image represented and stored as an array of pixels, referred to herein as "source image pixels" for ease of identification and explanation. Similarly, the halftone 804 may be a digital image consisting of an array of pixels, referred to herein as halftone pixels.

Halftone dot. A halftone dot, also referred to herein simply as a "dot," consists of one or more spots. For example, a thermal printer typically renders a dot as a collection of vertically-adjacent spots, while other devices may render a halftone dot as a two-dimensional array of spots. The resulting halftone dot may be any shape, such as a rectangle, rounded rectangle, or circle. Halftone dots in bilevel halftones are typically rendered as solid shapes of a uniform tone. A single halftone may contain halftone dots of various shapes and sizes. Each halftone pixel in a digital halftone may contain one or more halftone dots.

Spot. A "physical spot," as used herein, is a small shape, such as a rectangle or disk, that an output device has rendered at a particular point or within a particular area on an output medium. A physical spot is the smallest unit of output that an output device can generate. For example, a physical spot may be a spot of ink printed by a printer or a pixel displayed by a monitor. A physical spot may be any shape, such as a rectangle, rounded rectangle, or circle. Different output devices may render physical spots of different shapes and sizes, and a single output device may be capable of printing physical spots of varying sizes. For example, thermal-transfer printers typically pulse their heating elements to create physical spots. Each pulse of a heating element transfers a small amount of wax or ink to the output medium creating a small physical spot. A single heating element may be pulsed many times in succession to create many physical spots that together form a larger physical dot.

A "logical spot," as used herein, is a digital representation of a physical spot. A logical spot may be represented as, for example, a single bit in a bitmap. A logical spot may be stored in, for example, a computer-readable memory such as a RAM or in a file on a disk. As used herein, the term "spot" refers to both physical spots and to logical spots.

Point. A "point" is a mathematical construct that specifies a location that may be addressed by an output device such as a printer, plotter, or monitor. With respect to images, a point is defined by two-dimensional coordinates. The spatial resolution of an output device indicates how many points the output device is capable of addressing in a given area. For example, a printer that has a resolution of 300 points per inch (usually expressed as 300 dots per inch or 300 dpi), is capable of addressing (drawing spots) at 300 discrete points within an inch. Although this measure of resolution is relevant to the perceived quality of the output device's output, the perceived quality is also a function of the size of the spots that the output device prints at each point.

Addressability. As used herein, the term "addressability" refers to the maximum number of individual (not necessarily distinguishable) spots per inch that an output device is capable of printing. The addressability of a particular output device may differ in the horizontal and vertical directions. Addressability in the x (horizontal) direction is equal to the reciprocal of the distance between the centers of spots at addresses (x, y) and (x+1, y); similarly, addressability in the y (vertical) direction is equal to the reciprocal of the distance between the centers of spots at addresses (x, y) and (x, y+1). The image quality that is achievable with a particular output device depends on both the device's addressability and the spot size of the device.

Resolution. As used herein, the term "resolution" refers to the number of distinguishable lines per inch that a device can create. Resolution is defined as the closest spacing at which adjacent black and white lines can be distinguished. For example, if 40 black lines interleaved with 40 white lines can be distinguished across one inch, the resolution is 80 lines per inch.

Render. As used herein, the term "rendering" refers to the process of producing output on an output medium using an output device. For example, "rendering" includes printing ink or toner on a printed page, displaying pixels on a computer monitor, and storing a bitmap in RAM or other storage.

Region. As used herein, a "region" of an image may refer to any area within the image. For example, a region in a digital source image may include an area containing a single pixel or a collection of pixels, such as a two-dimensional array of pixels.

A continuous-tone image may contain any colors (tones) within a continuous range of colors. A grayscale image is a special kind of continuous-tone image that may contain any shades of gray within a continuous range of gray tones ranging from black to white. Conventional color and black-and-white photographs are examples of continuous-tone images.

In contrast, discrete-tone images may contain only a limited number of tones selected from a discrete set of tones. Computer output devices, such as monitors, printers, and plotters, are only capable of rendering discrete-tone images. Such devices are therefore referred to as discrete-tone output devices or digital output devices. For example, an 8-bit grayscale image printed on an inkjet printer may contain at most 256 ($2^8$) different shades of gray. Similarly, a 16-bit color image displayed on a computer monitor may contain at most 65,535 ($2^{16}$) different colors.

The increased use of computers for capturing, storing, transmitting, and rendering images has increased the need for faithful reproduction of continuous-tone images using discrete-tone output devices. Although such devices are not capable of directly producing the full range of tones that may be present in continuous-tone images, various techniques have been developed for using discrete-tone images to simulate continuous-tone images. Such discrete-tone images approximate the appearance of continuous-tone images when viewed from a suitable distance.

For example, some discrete-tone output devices, such as line printers, pen plotters, electrostatic plotters, some thermal printers, and some laser printers, produce output by depositing black ink or toner on an output medium such as plain paper. Such devices are referred to as bilevel devices because they are only capable of producing images containing two tones: a first tone (such as black) produced by depositing the ink or toner and a second tone (such as white or gray) produced by the output medium. Various techniques have been developed to enable bilevel devices to simulate the appearance of additional tones and thereby to produce discrete-tone images that appear similar to continuous-tone images when viewed from a suitable distance.

Various techniques for rendering continuous-tone images on discrete-tone output devices, such as bilevel devices, take advantage of the spatial integration that the human eye performs. We will term the amount of light reflected by a particular region of an image as the region's intensity. Perceived intensity is referred to as lightness. For example, in a continuous-tone grayscale image, regions with higher intensities appear closer to white and regions with lower intensities appear closer to black. The opposite of lightness is blackness. When the human eye views a small region of an image from a sufficiently large viewing distance, the eye averages fine (high spatial frequency) detail within the small region and records only the overall intensity of the region. This process is referred to as spatial integration.

Spatial integration is exploited, for example, when black-and-white continuous-tone photographs are printed in newspapers, magazines, and books using a technique referred to as halftoning. The image of the photograph that is printed on the page is referred to as a halftoned image or simply as a halftone. The photograph is considered to be composed of a two-dimensional array of small rectangular regions. To print the halftone, black spots of ink are typically printed at regularly-spaced locations in the halftone corresponding to each rectangular region in the original photograph. The area of each ink spot in the halftone is proportional to the amount of blackness in the corresponding rectangular region in the original photograph. When viewed at a suitable distance, the individual ink spots produce the appearance of appropriate shades of gray, thereby simulating the appearance of the original photograph.

Printing the halftone may be accomplished by covering the source image (e.g., a photograph) with a fine cross-hatched screen during exposure at a suitable stage in the photographic process leading to the printing plate. The result is to divide the halftone into very small, regularly spaced spots whose size varies with the image density being reproduced. Full-color printing is achieved by using three or four printing plates, one for each of the primary colors being used. Because undesirable Moiré patterns can be produced by the interactions among the spots produced by these different screens, the screens are usually arranged at various angles to each other (referred to as screen angles). In black-and-white bilevel halftoning, the single screen is oriented at a 45-degree angle to reduce the visibility of the halftone pattern.

Digital output devices, such as bilevel printers and plotters, can also be used to render approximations of continuous-tone images using a process referred to as digital halftoning (also referred to as spatial dithering). Rather than approximating continuous tones using a continuum of variable-area dots used in traditional halftoning, conventional digital halftoning typically makes use of rectangular arrays of dots (each of which may be a shape such as a rectangle or a circle) referred to as glyphs. When viewed from a distance, each repeated glyph pattern appears to be a different color or shade of gray. Glyphs may therefore be combined to simulate continuous-tone images.

For example, referring to FIGS. 1A–1E, a family of five glyphs 102a–e is shown. Each of the glyphs 102a–e is a 2×2 array of halftone pixels containing a unique pattern of dots. These glyphs 102a–e may be used to produce the appearance of five different intensity levels (shades of gray) when viewed from an appropriate distance. For example, the glyph 102a shown in FIG. 1A, which contains zero dots, may be used to simulate a single white pixel in the source image. Similarly, the glyph 102e shown in FIG. 1E may be used to simulate a single black pixel in the source image. The glyphs 102b–d shown in FIGS. 1B–1D may be used to simulate pixels in the source image having intermediate shades of gray. The glyphs 102a–e shown in FIGS. 1A–1E can be used to generate a halftone that simulates a source image by rendering, at locations in the halftone corresponding to each source image pixel, the glyph corresponding to the grayscale level of the pixel. When viewed from a suitable distance, the resulting halftone will appear similar to the source image. It should be appreciated that the grid lines shown in FIGS. 1A–1E are shown merely for purposes of illustration, and that they do not constitute parts of the glyphs and would not be rendered by an output device.

In general, an n×n group of bilevel pixels can be used to simulate $n^2+1$ intensity levels. Furthermore, there is typically an inverse relationship between the spatial resolution and intensity resolution of a halftone. For example, referring to FIGS. 2A–2J, the use of 3×3 glyphs 202a–202j reduces spatial resolution by a factor of three on each axis, but provides a total of 10 ($3^2+1$) intensity levels.

Various glyphs of various dimensions have been designed for use in digital halftoning, as is well known to those of ordinary skill in the art. See, for example, Ulichney, Robert (1987) Digital Halftoning, Cambridge, Mass.: The MIT Press. Note that the family of glyphs 102a–e shown in FIGS. 1A–1E and the family of glyphs 202a–j shown in FIGS. 2A–2J "grow" outward from the center of the glyphs as the intensity to be simulated decreases (i.e., as the blackness to be simulated increases). This conventional manner of glyph growth is referred to as clustered-dot ordered dithering.

A family of glyphs, such as the family of glyphs 102a–e shown in FIGS. 1A–1E and the family of glyphs 202a–j shown in FIGS. 2A–2J, may be represented by a dither matrix. A dither matrix is a matrix having dimensions that are equal to the dimensions of the glyphs in the family being used, and whose element values are used as threshold values to determine whether a particular glyph pixel contains a dot. For example, the 2×2 glyphs 102a–e shown in FIGS. 1A–1E may be represented by a dither matrix $D^{(2)}$ shown in Equation 1:

$$D^{(2)} = \begin{bmatrix} 0 & 2 \\ 3 & 1 \end{bmatrix} \qquad \text{Equation 1}$$

As described earlier, the blackness of a pixel refers to the opposite of its intensity. For example, in an image with five gray levels, where each pixel may have an intensity, I, ranging from 0 to 4, the blackness of a pixel may also range from 0 to 4 and is equal to 4−I. When generating a glyph corresponding to a pixel in the source image, the blackness of the source image pixel is compared to the value of each element in the dither matrix $D^{(2)}$. If the blackness of the source image pixel is greater than the element value, a dot is generated in the glyph pixel corresponding to the element. Otherwise, no dot is generated. For example, consider a pixel having an intensity of 1. This is equal to a blackness of 3 (4−1). The blackness of 3 is greater than or equal to 0 (the value of the upper-left element in the dither matrix), so a dot is rendered in the upper-left pixel of the glyph. Making similar comparisons of the blackness to the remaining elements of the dither matrix results in the glyph 102d shown in FIG. 1D. The order in which dots "grow" outward from the center of the glyph may be readily seen by reference to the locations of successive increasing values in the dither matrix.

Digital halftoning may be performed by devices other than bilevel devices. For example, consider an output device that has two bits per pixel and is therefore capable of outputting pixels of four different intensity levels. If 2×2 glyphs are used, there is a total of four pixels per glyph, and each pixel may display three intensities other than black. This allows 13 (4×3+1) intensities to be simulated using the glyphs. Various techniques for performing halftoning using such output devices are described in Computer Graphics: Principles and Practice ($2^{nd}$ Ed.), James D. Foley et al, Addison-Wesley (1997), pp. 568–574.

In the examples described above, the source image has fewer pixels than the output medium, so that multiple halftone pixels may be used to simulate a single pixel from the source image. Various techniques have also been developed for simulating a continuous-tone source image on an output medium having the same number of pixels as the source image, as will be discussed below.

Various kinds of conventional printers exist for printing discrete-tone images on physical output media, such as paper. Such printers include, but are not limited to, dot-matrix printers, plotters (such as pen plotters, flatbed plotters, drum plotters, desktop plotters, and electrostatic plotters), laser printers, inkjet printers, thermal-transfer printers, and thermal sublimation dye transfer printers.

For example, thermal-transfer printers contain a linear array of heating elements spaced very close together (e.g., 84.7 microns) which typically transfer colored pigments in wax from a donor sheet to plain paper. The wax-coated donor and plain paper are drawn together over the strip of heating elements, which are selectively heated to cause the pigment transfer. For color printing, the wax on the donor roll may be pigmented into alternating cyan, magenta, yellow, and black strips, each of a length equal to the paper size.

Dye sublimation printers are similar to thermal-transfer printers, except that the heating and dye transfer process permits varying intensities each of cyan, magenta, and yellow to be transferred, creating high-quality full-color images with a typical resolution of 300 dots per inch (dpi) Although this process is slower than wax transfer, the quality of the resulting output is higher. Thermal-transfer printers, dye sublimation printers, and other printers that use thermal energy to deposit ink or wax on an output medium are referred to herein as thermal printers.

It is important to preserve both spatial resolution and intensity resolution to faithfully simulate the source image, and to do so without introducing any visually objectionable artifacts. As described above, however, with conventional digital halftoning techniques there is typically a tradeoff between spatial resolution and intensity resolution. Halftones having a higher spatial resolution are more capable of accurately displaying finer details from the source image, while halftones having higher intensity resolution are capable of more accurately reproducing the full range of tones in the source image.

In one aspect of the present invention, a method is provided for producing a halftone of a source image. The halftone includes halftone pixels. The halftone pixels are suitable for containing halftone dots. The method generates glyphs corresponding to intensities of regions (e.g., pixels) in the source image. The glyphs contain one or more halftone dots. The method positions halftone dots within the halftone pixels such that for at least one pair of halftone dots contained within two halftone pixels that are adjacent along a predetermined axis of the halftone (e.g., a horizontal or vertical axis), the halftone dots in the pair of halftone pixels extend in opposite directions from a boundary shared by the two halftone pixels. These pairs of adjacent halftone dots, referred to as dot pairs, may be rendered by an output device, such as a thermal printer, as a single contiguous mark. The method may be used to produce halftones containing dots at various angles, such as 45 or 38 degrees, to reduce the visibility of the pattern. In one embodiment, each halftone dot corresponds to one source image pixel. Additional features and advantages of various embodiments of the present invention will be described in more detail below.

Figure 1A:
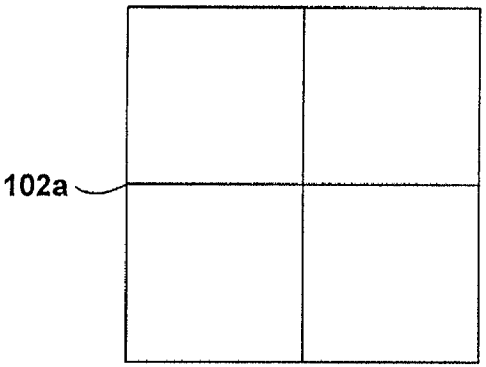
FIGS. 1A–1E are diagrams of 2×2 glyphs for use in digital halftoning.
Figure 1B:
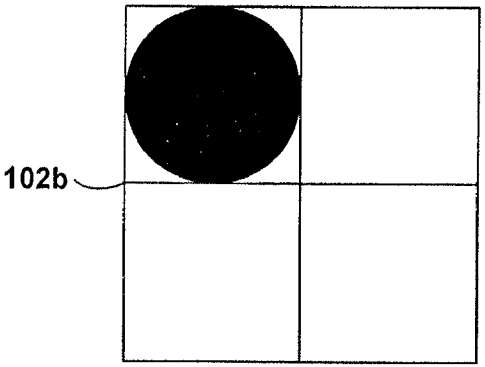
Figure 1C:
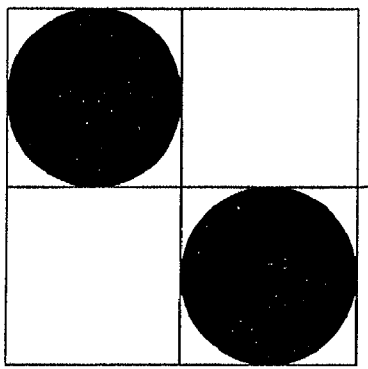
Figure 1D:
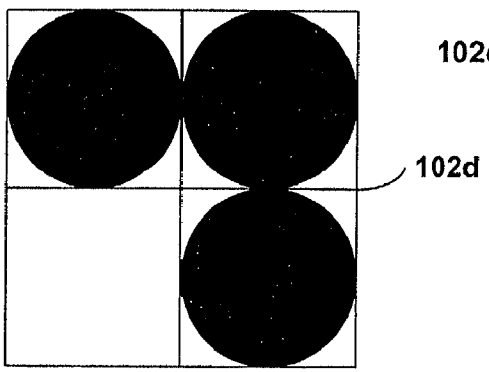
Figure 1E:
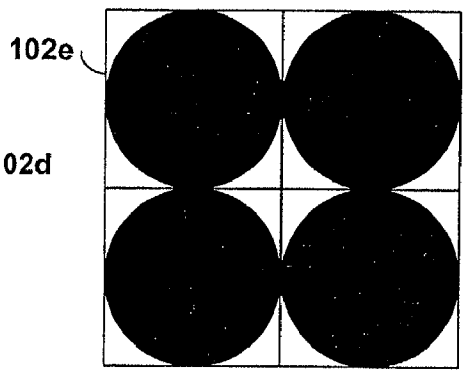
Figure 2A:
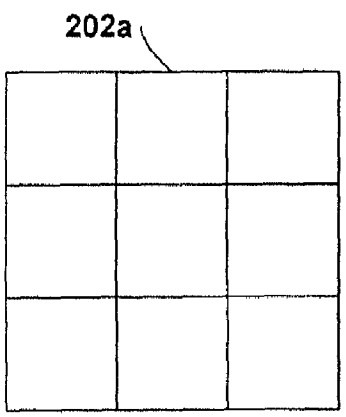
FIGS. 2A–2J are diagrams of 3×3 glyphs for use in digital halftoning.
Figure 2B:
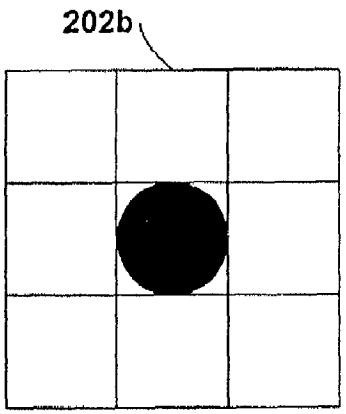
Figure 2C:
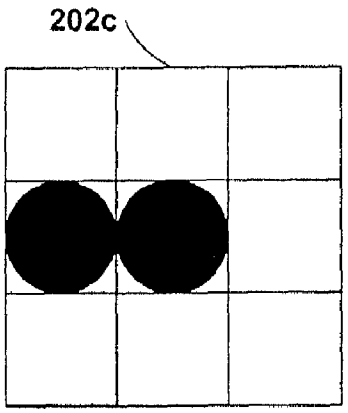
Figure 2D:
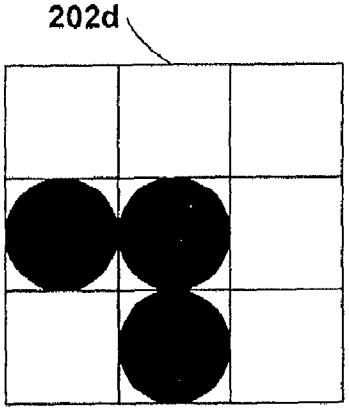
Figure 2E:
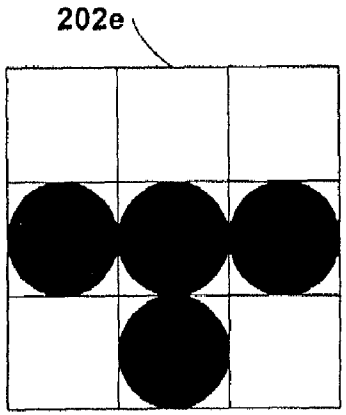
Figure 2F:
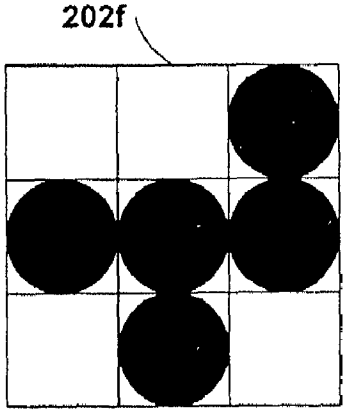
Figure 2G:
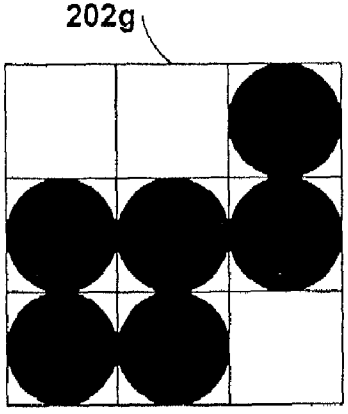
Figure 2H:
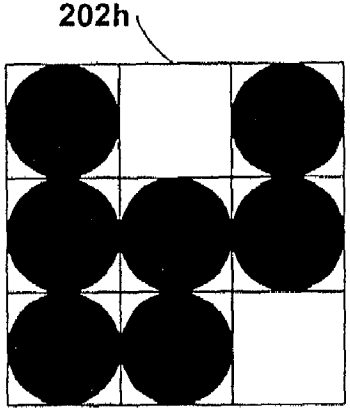
Figure 2J:
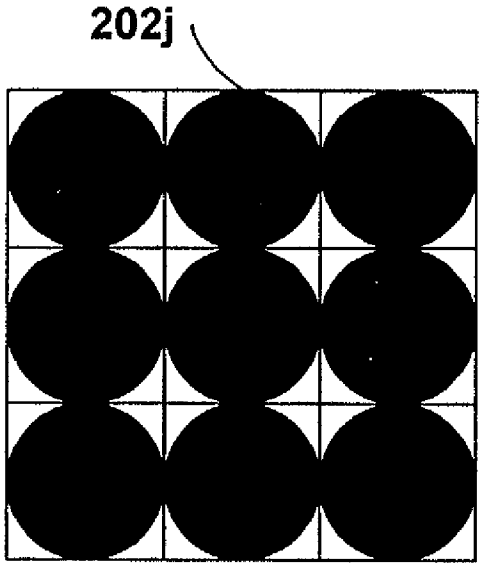
Figure 2I:
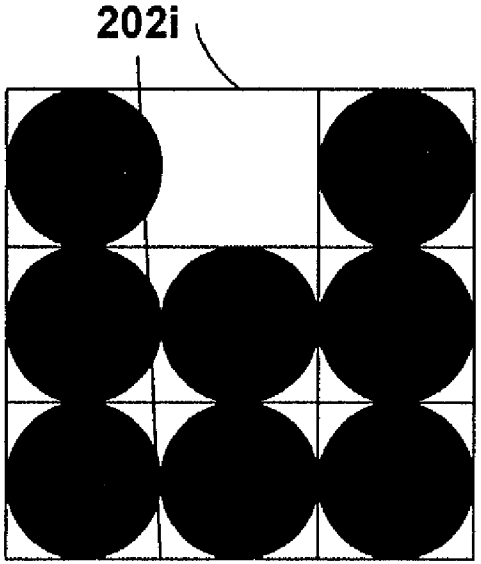
Figure 3A:
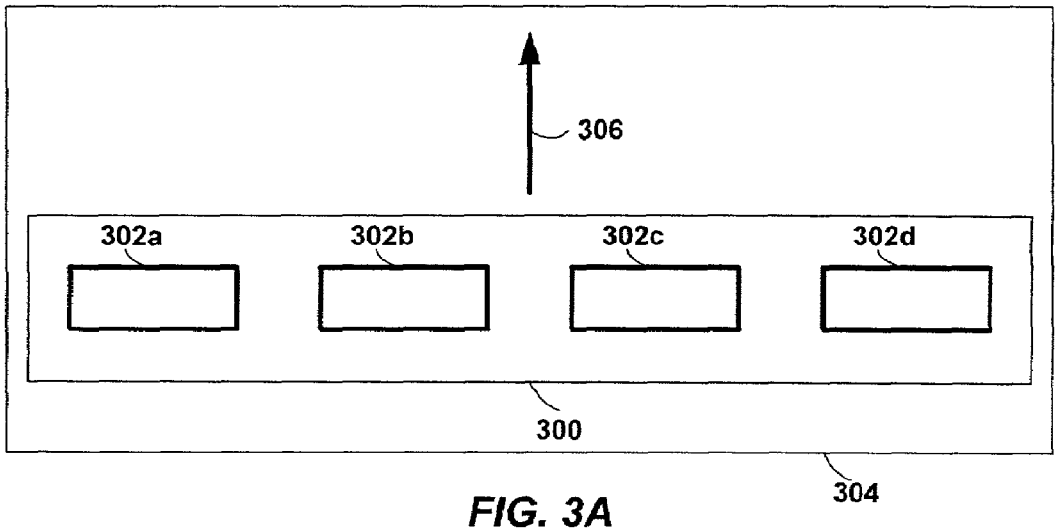
FIG. 3A is a block diagram of a thermal-transfer print head and an output medium on which the print head is capable of printing.

Referring to FIG. 3A, in a conventional bilevel thermal printer, a print head 300 includes a linear array of heating elements 302a–d. Although only four heating elements 302a–d are shown in FIG. 3A, it should be appreciated that a typical thermal print head includes a large number of small heating elements that are closely spaced at, for example, 300 elements per inch. Although the print head 300 shown in block diagram form in FIG. 3A is a print head capable of printing spots of a single color (such as black), thermal printers may have multicolor donor ribbons capable of printing spots of multiple colors. Furthermore, it should be appreciated that the heating elements 302a–d in the print head 300 may be of any shape and size, and may be spaced apart from each other at any appropriate distances and in any configuration.

As shown in FIG. 3A, the print head 300 is positioned over an output medium 304, such as plain paper. For purposes of illustration, only a portion of the output medium 304 is shown in FIG. 3A. The output medium 304 moves underneath the print head 300 in the direction indicated by arrow 306. A printer controller inside the thermal printer is capable of individually controlling each of the heating elements 302a–d. Activating an individual heating element causes black pigment (ink or wax) to be transferred to the area on the output medium 304 that is currently underneath the heating element, creating what is referred to herein as a spot. A bilevel digital image consisting of black and white pixels may be reproduced, for example, by printing spots at addresses (coordinates) on the output medium 304 corresponding to the black pixels and leaving blank the addresses corresponding to the white pixels.

Figure 3B:
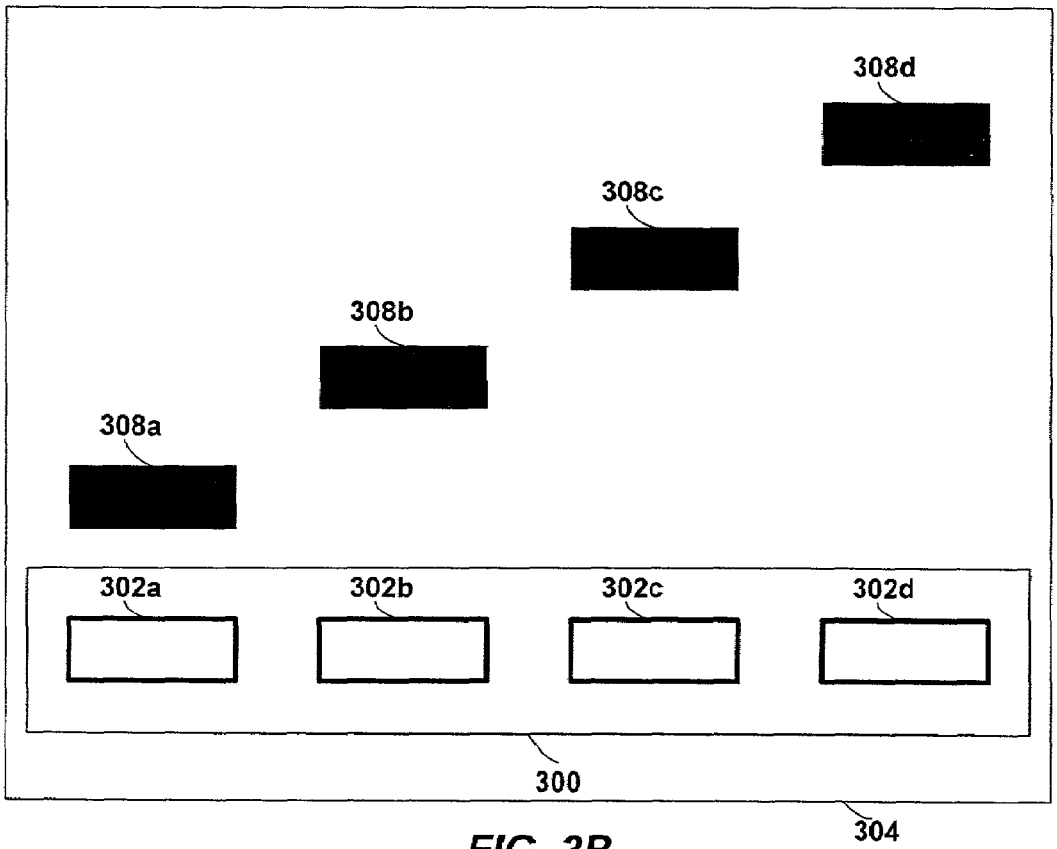
FIG. 3B is a block diagram of spots printed on an output medium by a thermal-transfer print head.

The smallest spot that may be printed by a thermal printer is approximately equal to the area of the face of each of the heating elements 302a–d. For example, referring to FIG. 3B, the output medium 304 is shown after four minimal-size spots 308a–d have been printed on the output medium 304, one by each of the heating elements 302a–d, in a diagonal pattern.

Figure 3C:
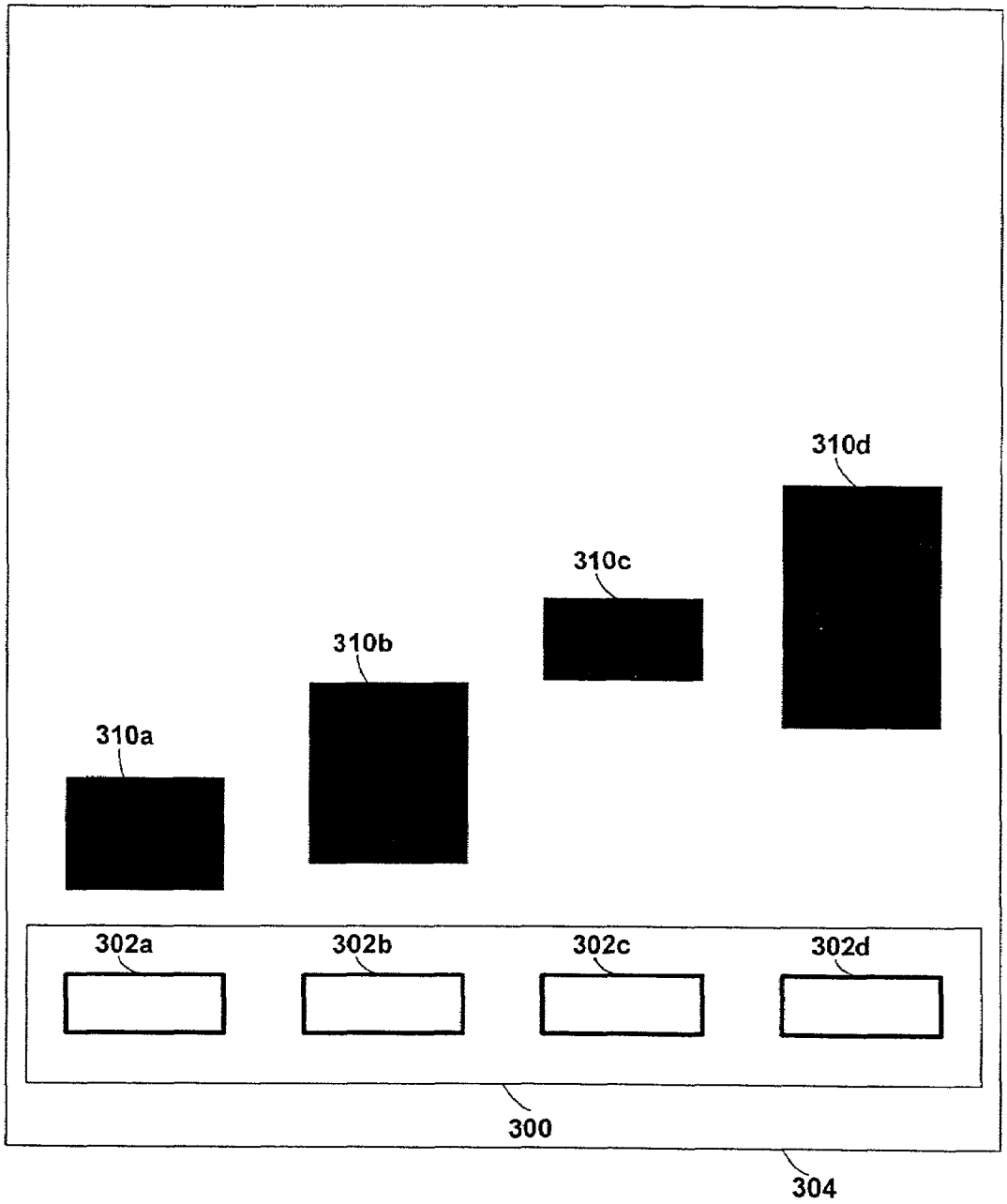
FIG. 3C is a block diagram of variable-size spots printed on an output medium by a thermal-transfer print head.

It is possible to create larger spots by activating a particular heating element for a longer period of time. The activated heating element will continue to transfer black pigment to the output medium 304 as long as the heating element is activated, thereby creating a larger spot. For example, referring to FIG. 3C, an example is shown in which four different-sized spots 310a–d have been printed on the output medium 304, one by each of the heating elements 302a–d.

Figure 4A:
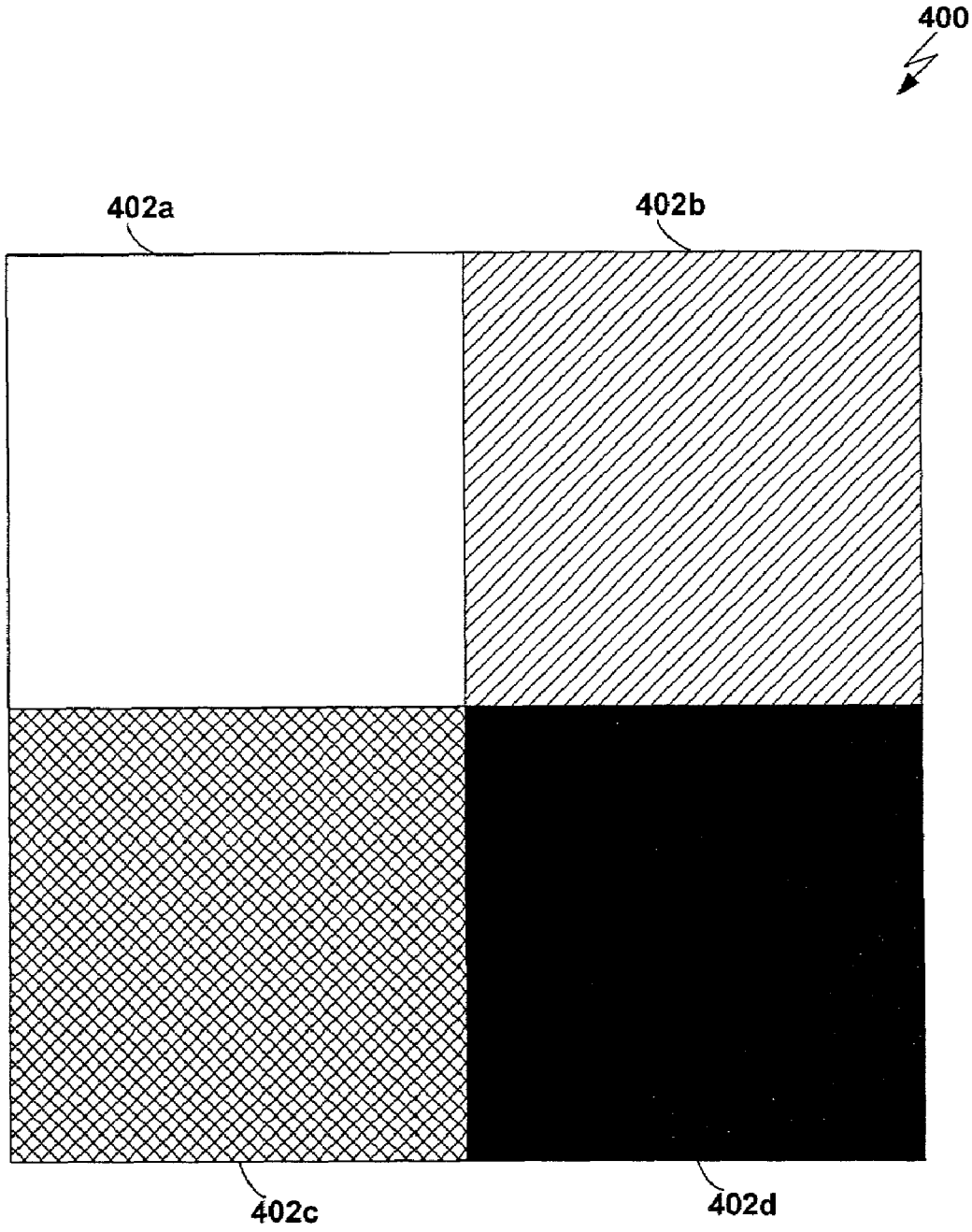
FIG. 4A is a block diagram of a 2×2 array of 2-bit source image pixels.

As described above, thermal printers may be used to print digital images. For example, referring to FIG. 4A, a block diagram representing an 8-bit digital source image 400 is shown. The digital source image consists of a 2×2 array of 8-bit source image pixels 402a–d, each having an intensity that is in the range of 0–255. For example, the source image pixel 402a, which is white, has an intensity of 255, the source image pixel 402b, which is light gray, has an intensity of 172, the source image pixel 402c, which is dark gray, has an intensity of 86, and the source image pixel 402d, which is black, has an intensity of 0. Although the gray source image pixels 402b and 402c are illustrated in FIG. 4A using cross-hatched patterns for ease of illustration, it should be appreciated that such pixels would typically be displayed by a multitone output device (such as a color monitor) using shades of gray rather than cross-hatched patterns or other dithered patterns. As used herein, a blank pattern indicates a white pixel (intensity 255), a single cross-hatched pattern indicates a light gray pixel (intensity 172), a double cross-hatched pattern indicates a dark gray pixel (intensity 86), and a black pattern indicates a black pixel (intensity 0).

Figure 4B:
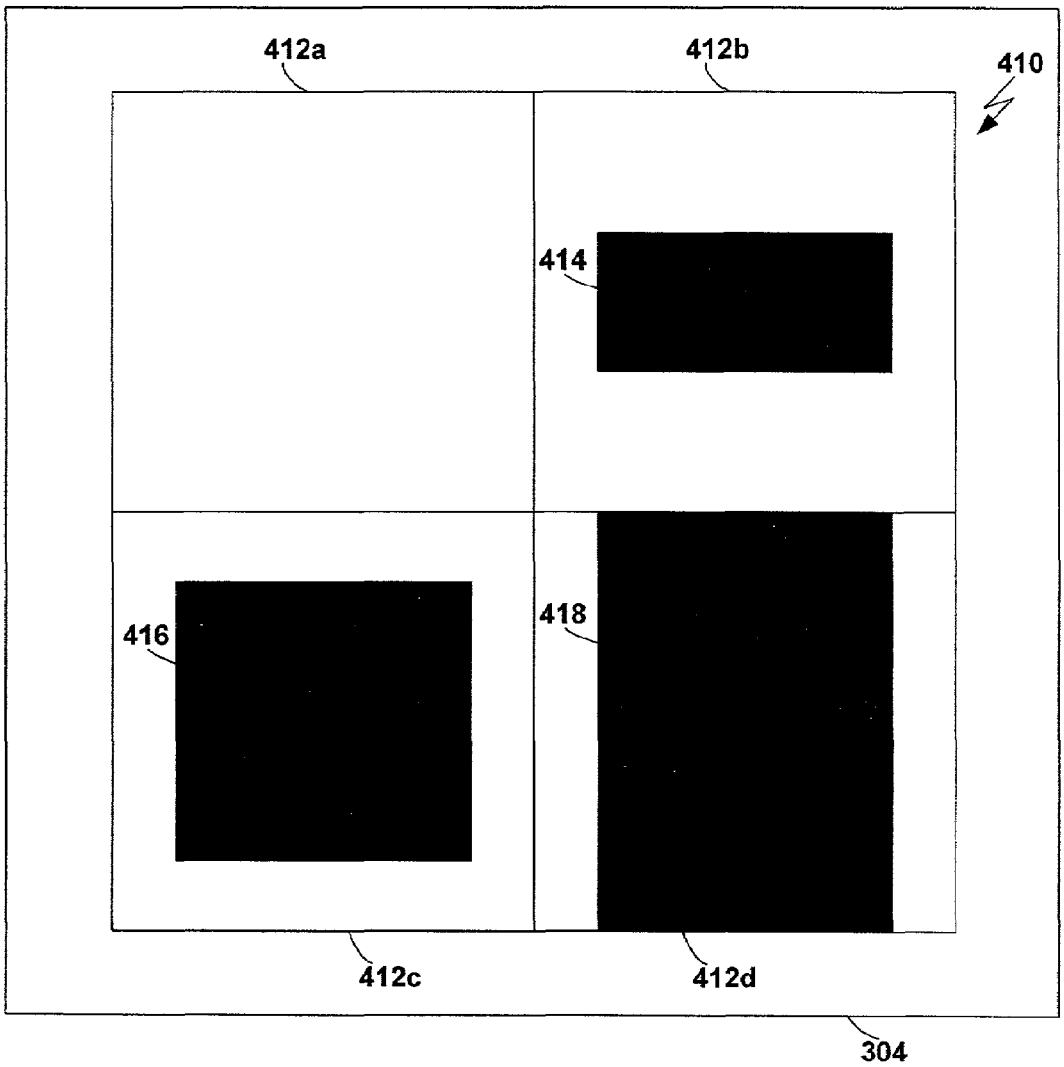
FIG. 4B is a block diagram of a 2×2 array of halftone pixels containing dots corresponding to the source image pixels of FIG. 4A.

One technique for printing a halftone of a digital image, such as the digital image 400 shown in FIG. 4A, using a bilevel thermal-transfer printer is as follows. Referring to FIG. 4B, an addressable region of the output medium 304 is structured according to a 2×2 halftone cell 410 consisting of four halftone pixels 412a–d. It should be appreciated that the halftone pixel boundary outlines are not printed on the output medium 304, but are shown merely for purposes of illustration. Each of the halftone pixels 412a–d corresponds to one of the source image pixels 402a–d (FIG. 4A). For example, halftone pixel 412a corresponds to source image pixel 402a, halftone pixel 412b corresponds to source image pixel 402b, halftone pixel 412c corresponds to source image pixel 402c, and halftone pixel 412d corresponds to source image pixel 402d.

As shown in FIG. 4B, each of the halftone pixels 412a–d contains a dot that is centered within the halftone pixel and whose size is proportional to the blackness of the corresponding source image pixel. As described above, blackness B is the inverse of intensity I, so in this case B=255−I. Therefore, referring to FIG. 4B, halftone pixel 412a does not contain a dot because the blackness of the corresponding source image pixel 402a is 0 (255−255). A small dot 414 is centered within halftone pixel 412b, corresponding to the low blackness of the source image pixel 402b. A larger dot 416 is centered within halftone pixel 412c, corresponding to the higher blackness of the source image pixel 402c. Finally, a very large dot 418 is centered within halftone pixel 412d, corresponding to the maximal blackness of the source image pixel 402d. It should be appreciated that using the dot placement scheme shown in FIG. 4B, each of the dots "grows" outward from the center of the halftone pixel as the blackness of the source image pixel to be reproduced increases.

Different-sized dots, such as the dots 414, 416, and 418 shown in FIG. 4B, may be used to simulate different shades of gray. When viewed from a distance, dots such as the dots shown in FIG. 4B appear as different shades of gray. Larger dots appear to be darker shades of gray while smaller dots appear to be lighter shades of gray.

It should be appreciated that thermal printers are typically limited in the sizes of spots that they are capable of printing, and as a result such printers may not be capable of printing a unique-sized spot for each possible source image pixel blackness. For example, a particular thermal printer may only be capable of printing 64 different sizes of spot within a halftone pixel even though the source image to be printed may contain 256 different shades of gray. Therefore, the same size spot may be printed for source image pixels within a range of blackness.

The use of a rectangular pattern of dots, such as that shown in FIG. 4B, has a number of disadvantages. For example, the human visual system is very sensitive to horizontal and vertical patterns. As a result, patterns arranged in the manner shown in FIG. 4B are particularly visible to the human eye, limiting the usefulness of such patterns for simulating shades of gray. Furthermore, the small dots that are used in such a pattern tend to be grainy due to process variation. In addition, closely-printed spots that are printed in such a pattern can connect to each other, resulting in the creation of a connected line where only separate spots were intended (a phenomenon known as "bridging of the dots"). Several techniques may be used to reduce the impact of these problems.

Figure 5A:
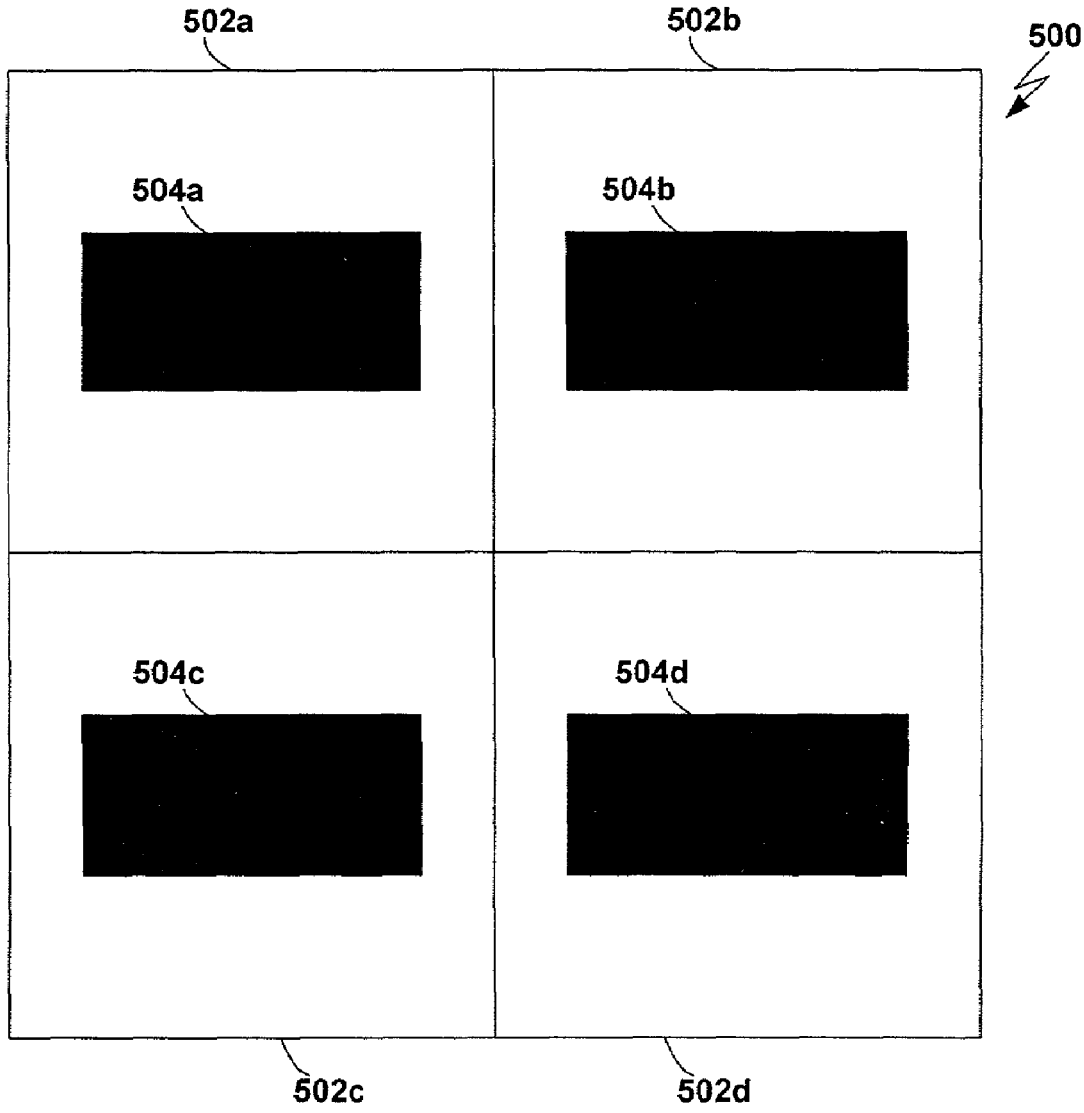
FIG. 5A is a block diagram of a 2×2 array of halftone pixels containing uniform-sized dots.

For example, referring to FIG. 5A, a 2×2 halftone cell 500 containing four halftone pixels 502a–d is shown. The cells 502a–d contain halftone dots 504a–d, respectively. For purposes of illustration, each of the dots 504a–d is the same size. The halftone cell 500 shown in FIG. 5A is arranged according to a conventional rectangular pattern, and therefore may suffer from some of the visual artifacts described above.

Figure 5B:
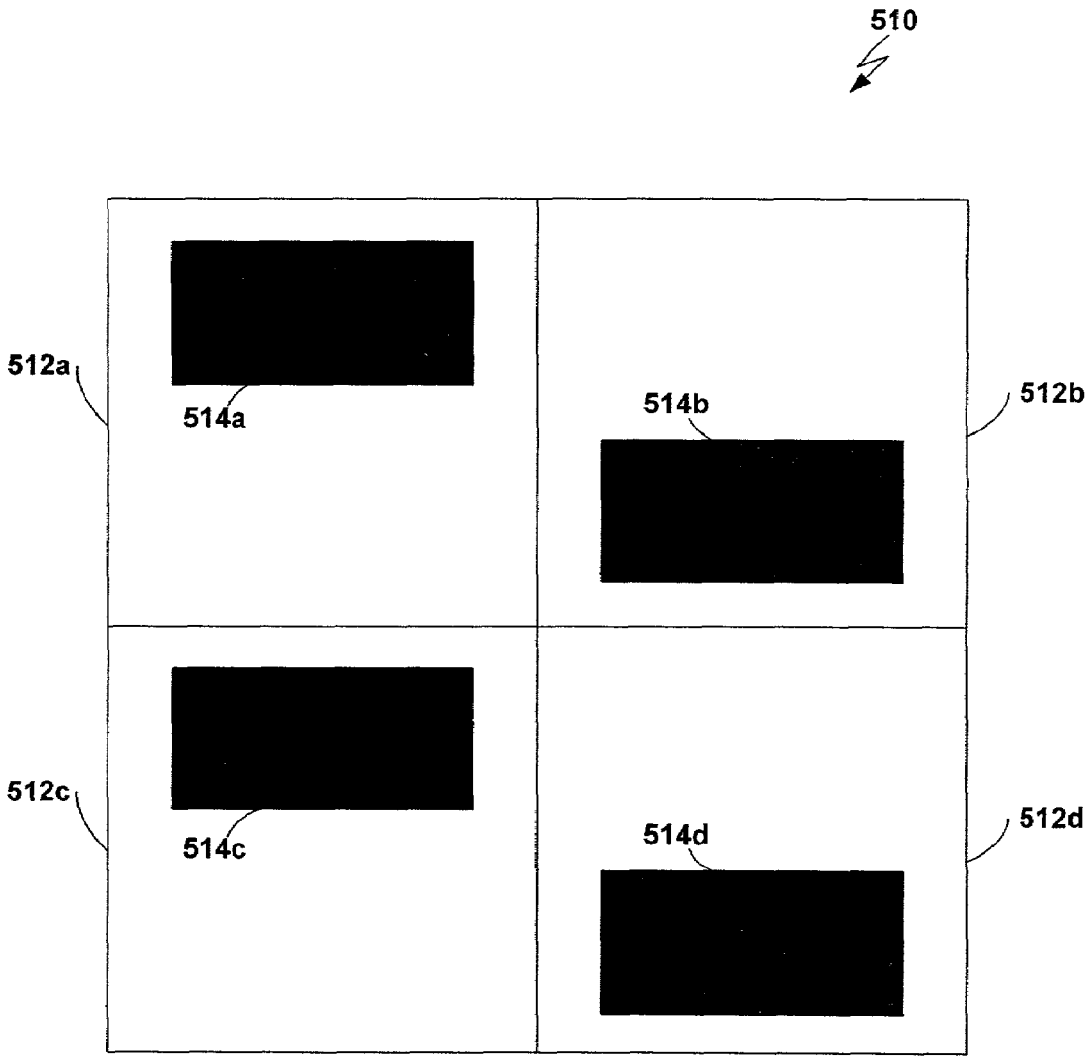
FIG. 5B is a block diagram of four dots printed in a hexagonal pattern on an output medium.

Referring to FIG. 5B, these visual artifacts may be mitigated by arranging the cells 502a–d in a hexagonal pattern, producing halftone pixels 512a–d containing dots 514a–d, respectively. Use of the hexagonal pattern produces less pattern visibility and bridging than the rectangular pattern shown in FIG. 5A.

Figure 5C:
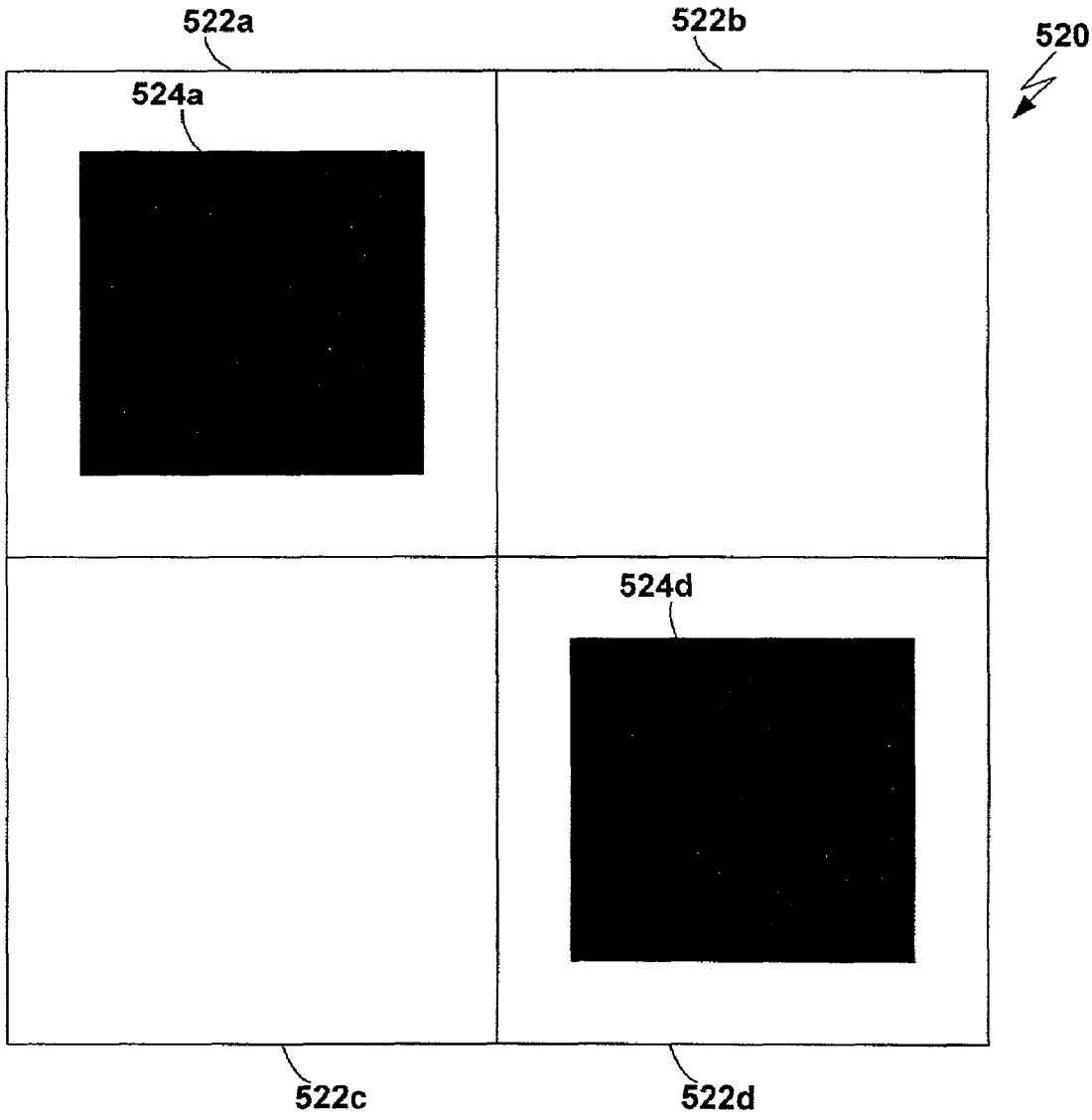
FIG. 5C is a block diagram of dots printed in a 45-degree pattern on an output medium.

Further improvement may be made by combining dots together to produce a pattern of dots at 45-degree angles as shown in FIG. 5C. To produce the pattern shown in FIG. 5C, the blacknesses of vertically-adjacent pairs of pixels in the source image are summed to produce a summed blackness value. A dot whose size is proportional to the summed blackness value is centered within a halftone pixel corresponding to the two source image pixels. For example, referring to FIG. 5A, the blackness values of the source image pixels corresponding to vertically-adjacent halftone pixels 502a and 502c are summed, and a dot 524a is centered within corresponding halftone pixel 522a in halftone cell 520 (FIG. 5C). Similarly, the blackness values of the source image pixels corresponding to vertically-adjacent halftone pixels 502b and 502d are summed, and a dot 524d is centered within corresponding halftone pixel 522d in halftone cell 520 (FIG. 5C). The arrangement of spots at 45-degree angles produces a coarser pattern, which reduces both the grain and bridging with minimal increase in pattern visibility.

Figure 5D:
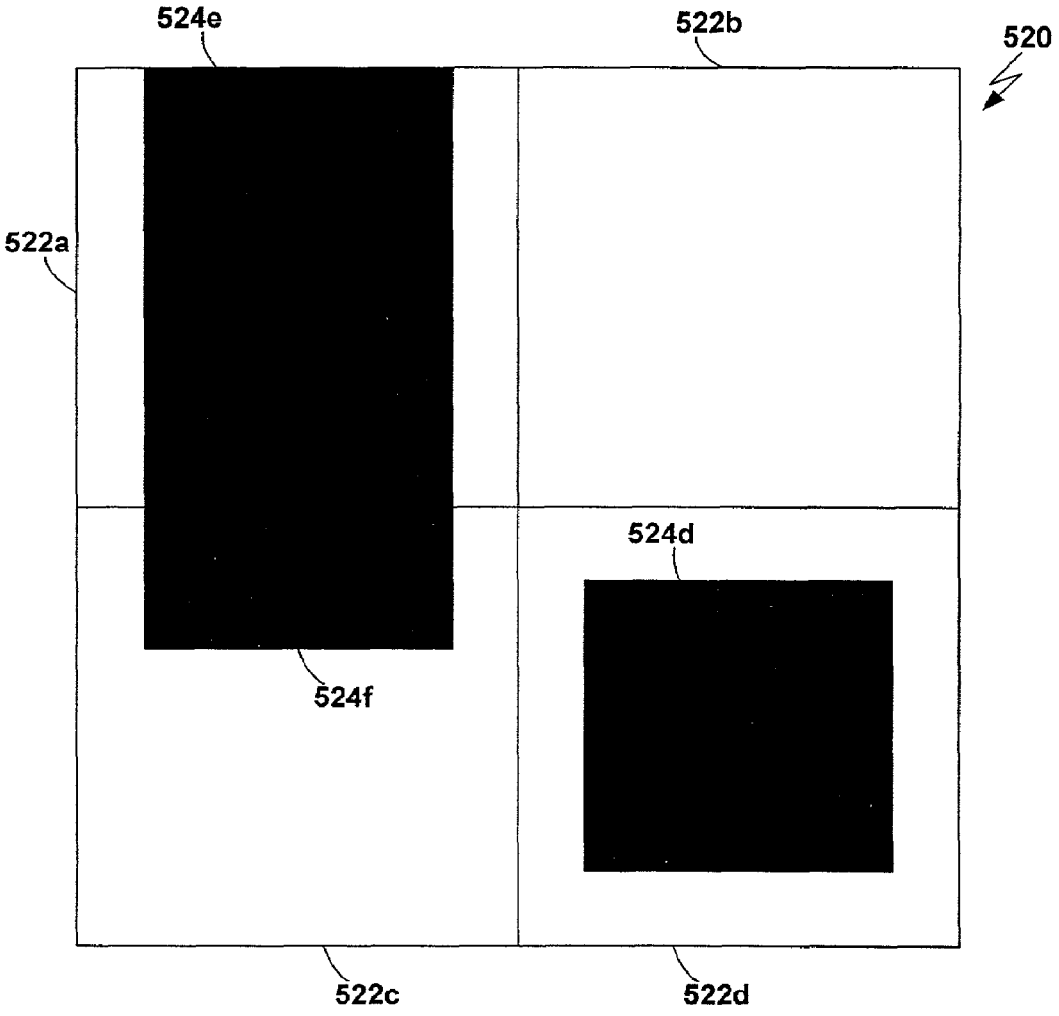
FIG. 5D is a block diagram of dots printed in a 45-degree pattern on an output medium, including a dot that extends across a pixel boundary.
Figure 5E:
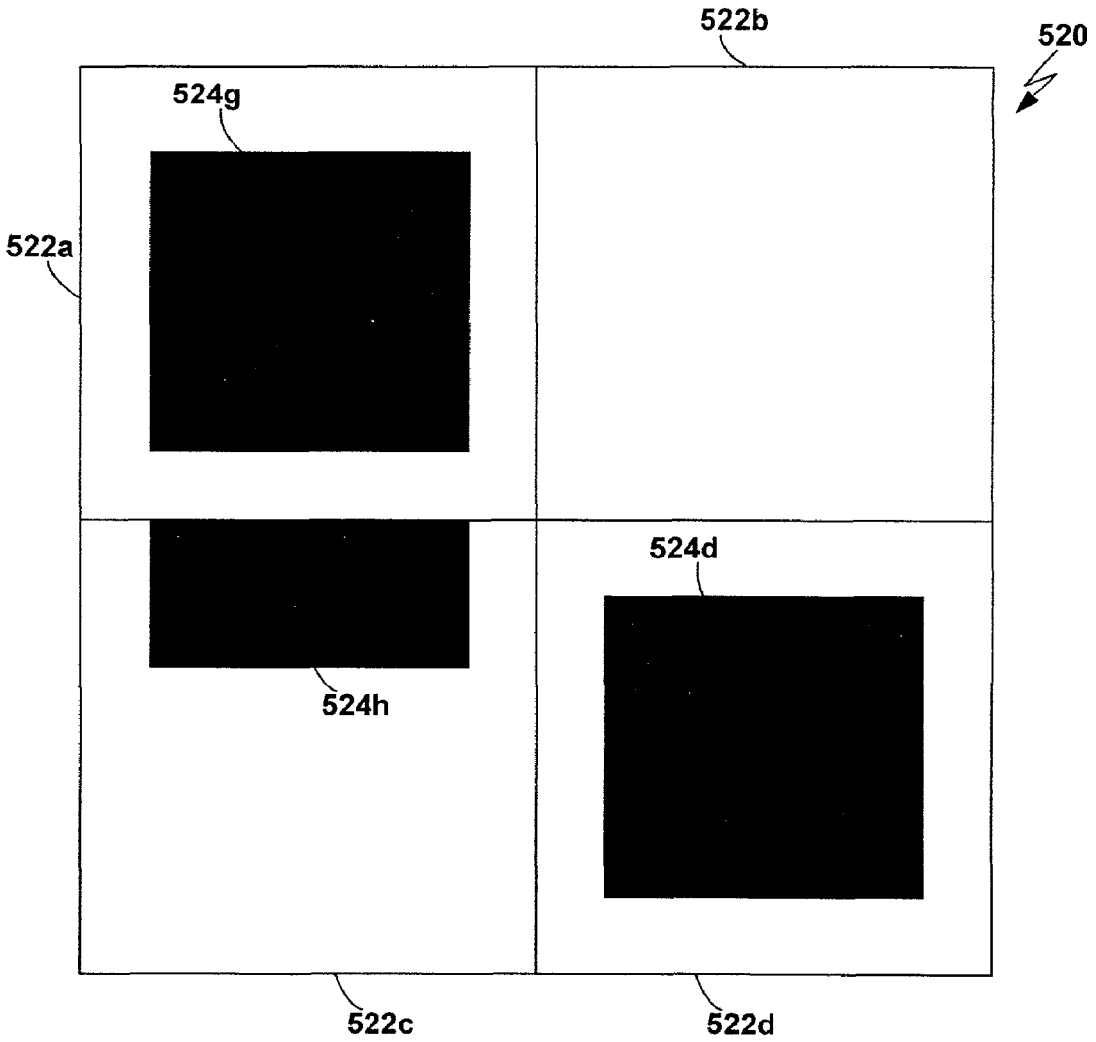
FIG. 5E is a block diagram of dots printed in a 45-degree pattern on an output medium, including a spurious cross-pixel dot extension.

Although FIG. 5C contains two empty pixels 522b and 522c, it should be appreciated that the dots 524a and 524d may grow large enough to expand into pixels 522b and 522c. For example, referring to FIG. 5D, dot 524e is large enough to expand into pixel 522c (and into another pixel, not shown, that is above pixel 522a). Dot 524e therefore includes dot continuation 524f that is within pixel 522c. Conventional algorithms that are used to render dots, such as dot 524e, that expand into neighboring pixels sometimes produce incorrect results in the form of spurious dot continuations at halftone pixel boundaries corresponding to regions of high gradient in the source image. For example, referring to FIG. 5E, pixel 522c includes a spurious halftone dot continuation 524h. This results from the fact that conventional rendering algorithms generate dot continuations (such as the dot continuation 524h) based on a presumption that neighboring regions in the source image have similar intensities. When neighboring regions in the source image do not have similar intensities, dot continuations are incorrectly generated, resulting in undesirable visual artifacts in the halftone.

In one embodiment of the present invention, a halftone of a source image is produced in which halftone dots extend either upward or downward from halftone pixel boundaries, rather than outward from halftone pixel centers. The direction of dot extension (either upward or downward) depends on the coordinates of the halftone pixel in which the dot is printed. For example, according to one embodiment of the present invention, dots in vertically adjacent halftone pixels extend in opposite directions from a pixel boundary shared by the adjacent halftone pixels. Pairs of dots that extend in opposite directions from a common halftone pixel boundary are referred to herein as dot pairs. In a further embodiment, each pair of dots vertically- or horizontally-adjacent halftone pixels extend in opposite directions. For example, if a halftone dot extends upward from the bottom boundary of a halftone pixel, then a halftone dot in a bordering halftone pixel extends downward from the top boundary of the bordering halftone pixel. As used herein, the term "bordering" refers to adjacent pixels that are either within the same row or the same column.

In one embodiment of the present invention, a dot pair is rendered as a single contiguous mark. For example, a dot pair may be rendered as a single contiguous mark by a single thermal print head element. The mark may consist of one or more connected spots. This process for generating a halftone of a source image is described in more detail below.

Figure 6A:
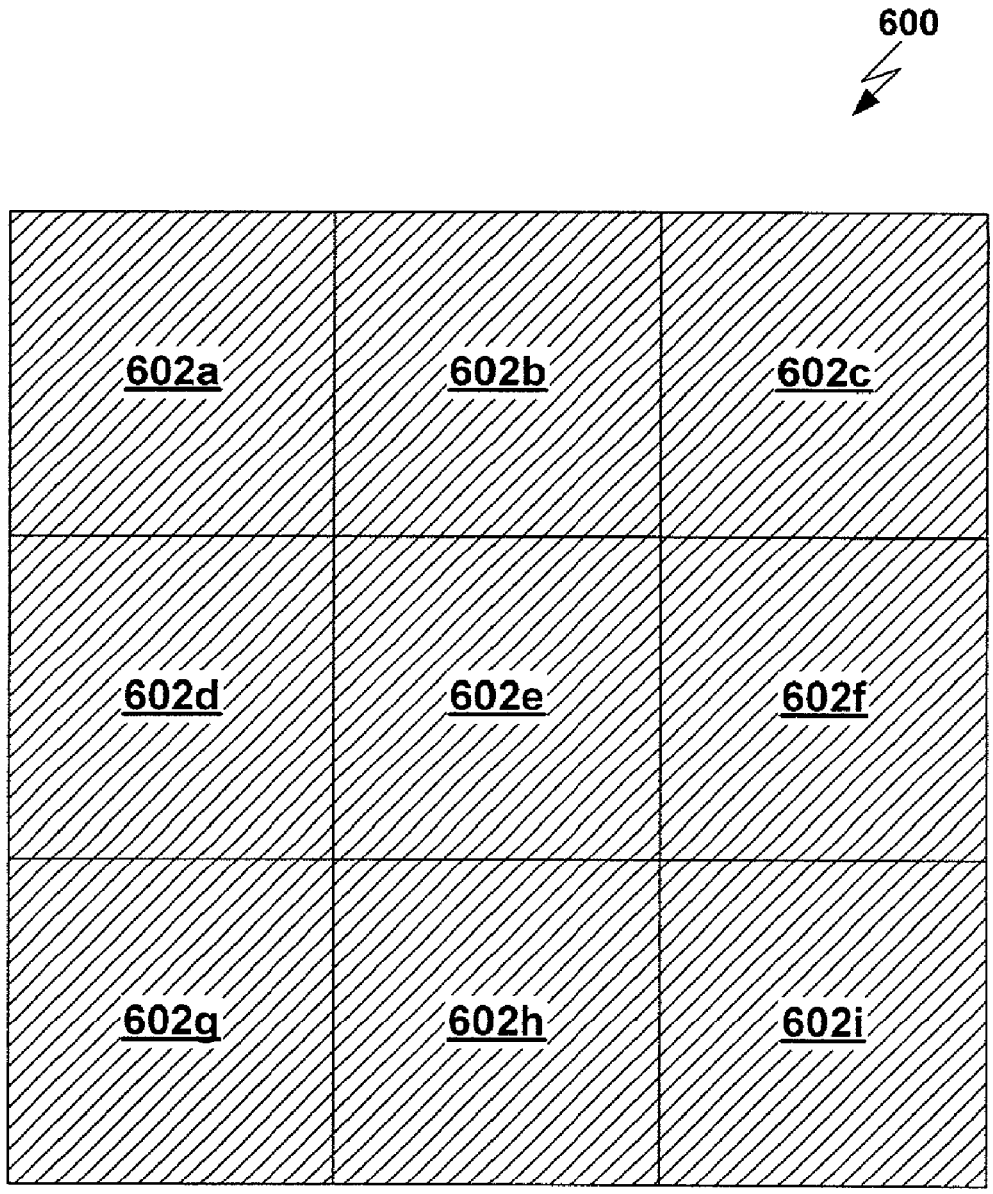
FIG. 6A is a block diagram of a 3×3 array of grayscale source image pixels.

Referring to FIG. 6A, a 3×3 8-bit digital source image 600 is shown. The digital source image 600 includes nine source image pixels 602a–i. For purposes of example, each of the source image pixels 602a–i has an intensity of 128, which corresponds to a shade of gray approximately midway between black and white.

Figure 6B:
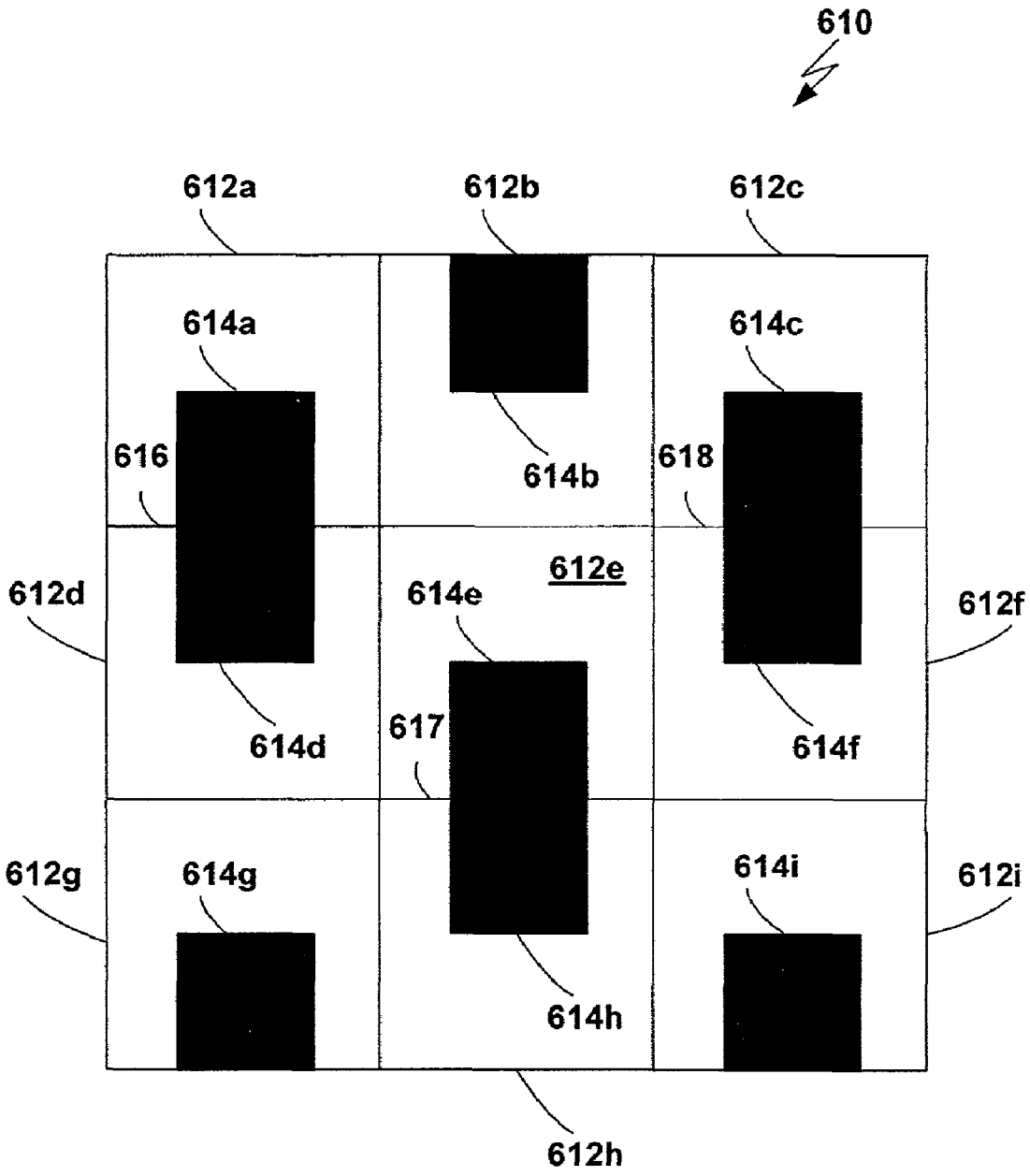
FIG. 6B is a block diagram of a 3×3 array of halftone pixels rendered on an output medium according to one embodiment of the present invention.

Referring to FIG. 6B, a digital halftone 610 is shown that simulates the digital source image 600 according to one embodiment of the present invention. As shown in FIG. 6B, the digital halftone 610 consists of a 3×3 array of halftone pixels 612a–i. Each of the halftone pixels 612a–i corresponds to a source image region (e.g., a single source image pixel) in the digital source image 600 having corresponding coordinates. For example, the halftone pixel 612a at coordinates (0, 0) corresponds to the source image pixel 602a in the digital image 600 at coordinates (0, 0).

Each of the halftone pixels 612a–i contains a dot whose size is proportional to the blackness B (255−I) of the corresponding source image region. The dot extends either upward from the bottom boundary of the halftone pixel or downward from the top boundary of the halftone pixel, depending on the coordinates of the halftone pixel. For example, in FIG. 6B each dot extends in the opposite direction from the dots in each of its four horizontal and vertical neighbors. For example, consider halftone pixel 612e. Its horizontal neighbors are halftone pixels 612d and 612f, and its vertical neighbors are halftone pixels 612b and 612h. The dot 614e in halftone pixel 612e, therefore, extends upward from bottom boundary 617 of halftone pixel 612e, while the dots 614d, 614f, 614b, and 614h, in halftone pixels 612d, 612f, 612b, and 612h, respectively, extend in the opposite direction, namely downward from the top boundaries of their respective halftone pixels.

The result of this pattern of dot extension is to create pairs of vertically-adjacent dots that extend from (abut) a common halftone pixel boundary. For example, vertically-adjacent dots 614a and 614d extend from a common halftone pixel boundary 616 between halftone pixels 612a and 612d. Similarly, vertically-adjacent dots 614c and 614f extend from a common halftone pixel boundary 618 between halftone pixels 612c and 612f. These pairs of vertically-adjacent dots that are joined by a common halftone pixel boundary (i.e., dots 614a and 614d, 614e and 614h, and 614c and 614f) are referred to herein as dot pairs. In one embodiment of the present invention, a dot pair is rendered (e.g., printed) as a single contiguous mark using, for example, a single thermal print head element.

Each of the dots 614a–i shown in FIG. 6B is the same size because each corresponds to source image pixels 602a–i having the same intensity. Dots generated by various embodiments of the present invention, however, may be of various sizes to simulate source image regions having various intensities. For example, referring to FIG. 6C, a 3×3 8-bit digital source image 620 is shown. The source image 620 includes nine source image pixels 622a–i. White source image pixels 622b, 622d, and 622i each has an intensity of 255. Gray source image pixels 622a, 622e, 622f, and 622g each has an intensity of 128. Black source image pixels 622c and 622h each has an intensity of 255.

Figure 6C:
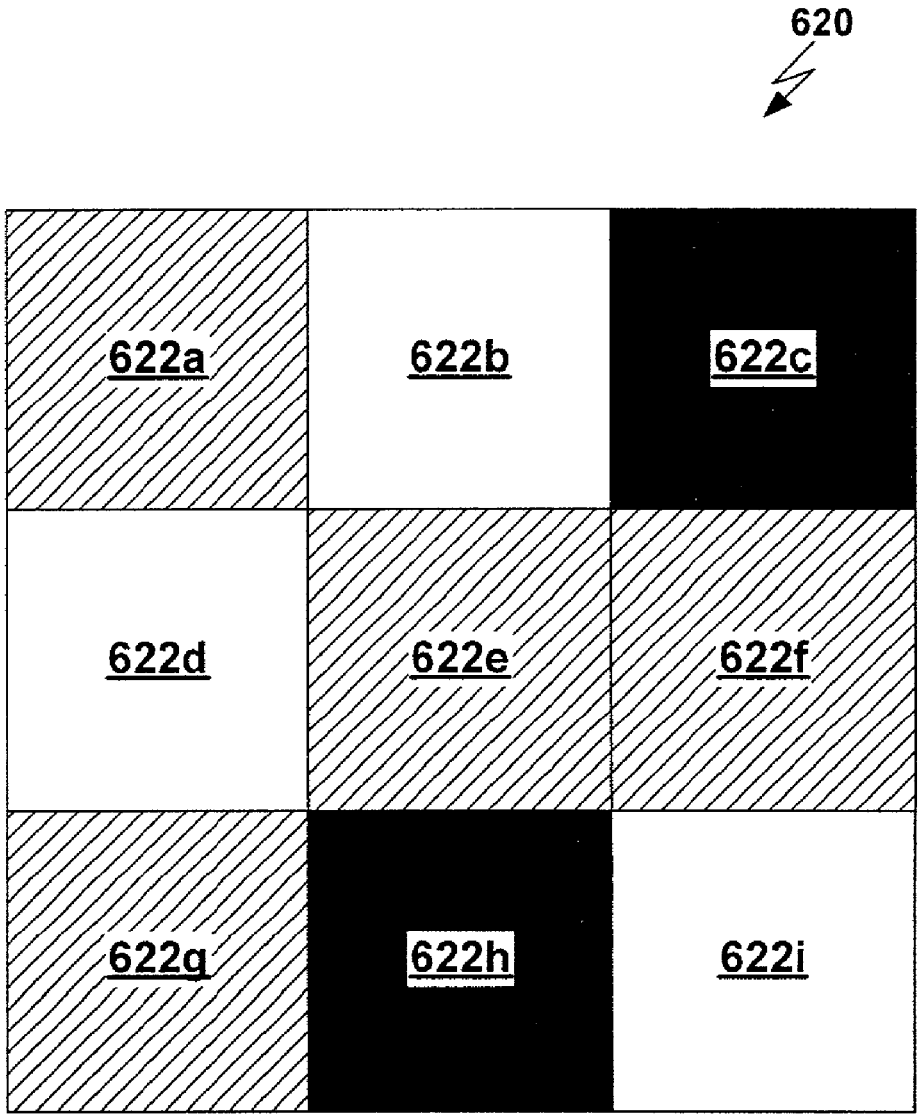
FIG. 6C is a block diagram of a 3×3 array of grayscale source image pixels.
Figure 6D:
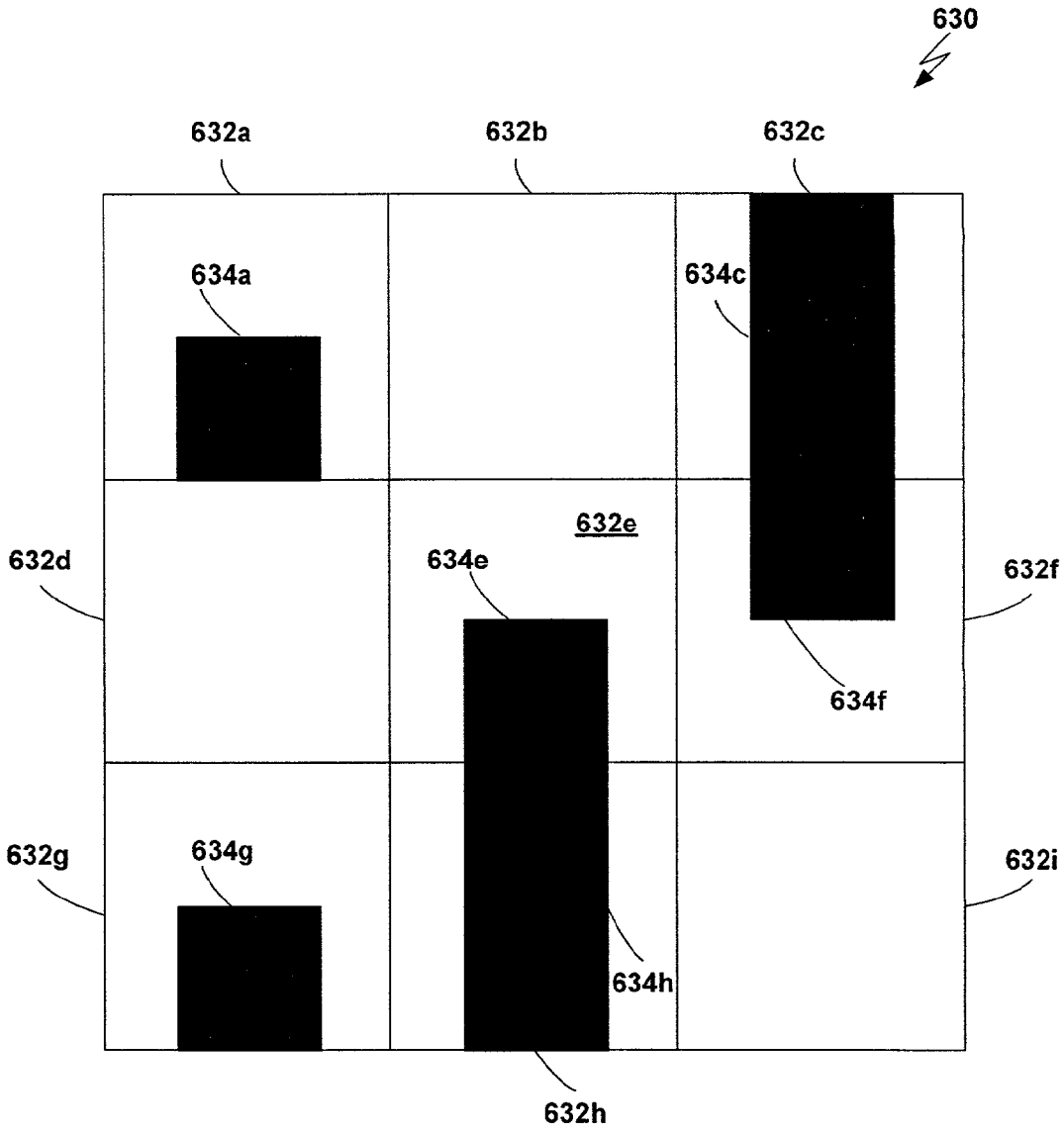
FIG. 6D is a block diagram of a 3×3 array of halftone pixels arranged in a 45-degree pattern according to one embodiment of the present invention.

Referring to FIG. 6D, a halftone 630 corresponding to the source image 620 shown in FIG. 6C is shown according to one embodiment of the present invention. As shown in FIG. 6D, the halftone 630 consists of a 3×3 array of halftone pixels 632a–i. Each of the halftone pixels 632a–i corresponds to a single source image region (e.g., a single pixel) having corresponding coordinates. The size of each dot in the halftone 630 is proportional to the blackness of the corresponding source image region. For example, halftone pixels 632b and 632d do not contain any dots (i.e., they contain dots of size zero), because they correspond to source image pixels 622b and 622d, whose blackness is zero. The dots 634a, 634e, 634f, and 634g are half the height of the halftone pixels 632a, 632e, 632f, and 632g, respectively, because they correspond to source image pixels 622a, 622e, 622f, and 622g, respectively, whose blackness (128) is approximately half the maximum possible blackness. Finally, dots 634c and 634h are each the full height of halftone pixels 632c and 632h, because they correspond to source image pixels 622c and 622h having maximal blackness.

Figure 6E:
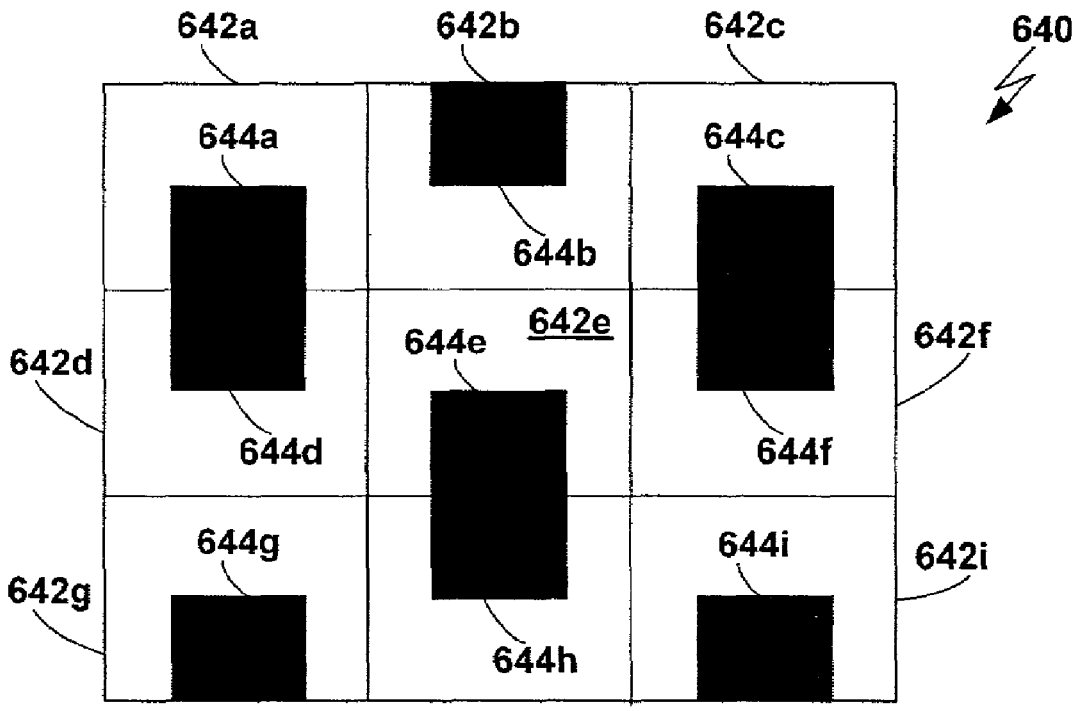
FIG. 6E is a block diagram of a 3×3 array of halftone pixels arranged in a 38-degree pattern according to one embodiment of the present invention.
Figure 6F:
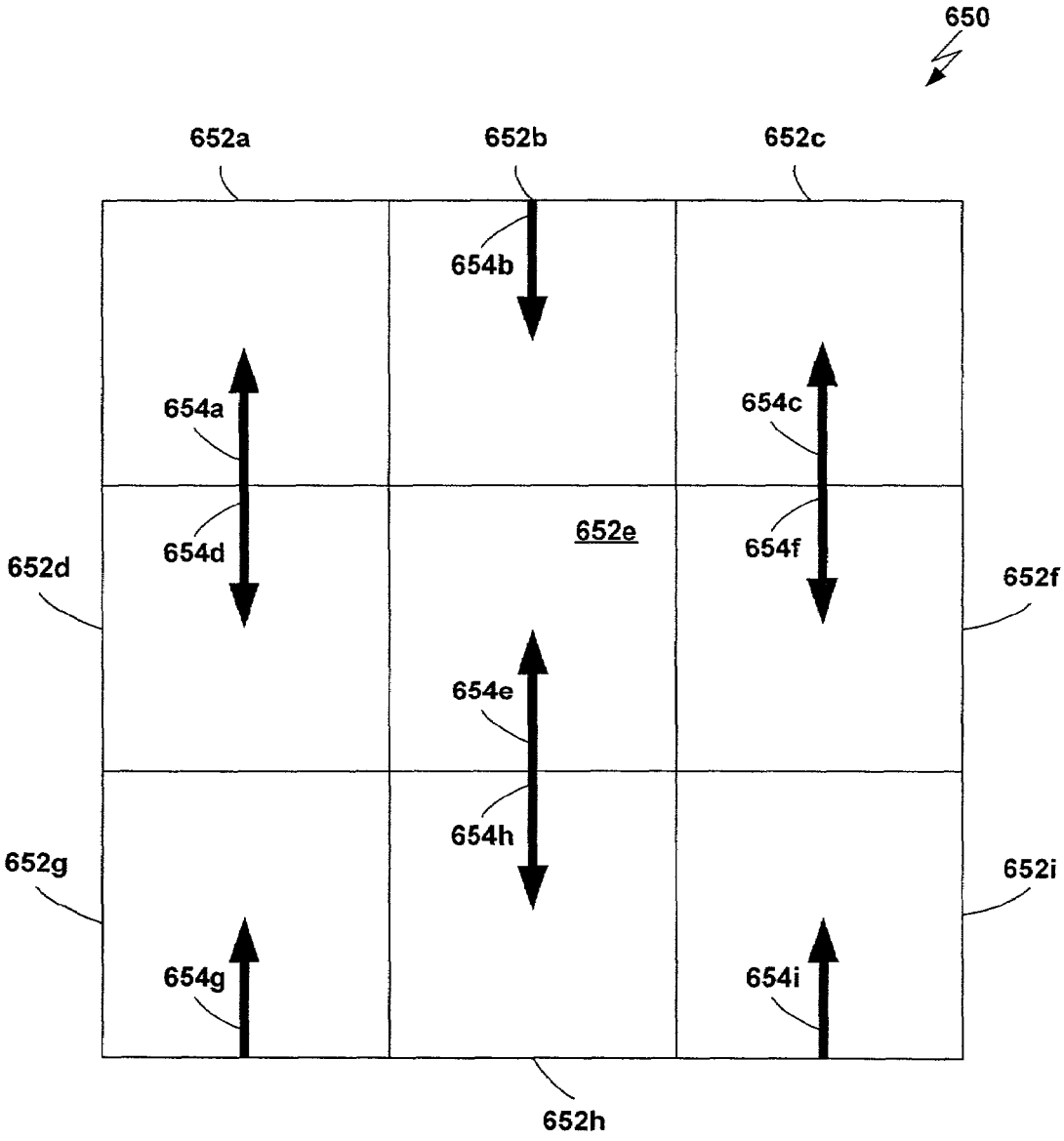
FIG. 6F is a block diagram of a 3×3 array of halftone dot vectors used by a halftoning process according to one embodiment of the present invention.

Dots in halftone pixels 632a, 632c, 632e, 632g, and 632i extend upward from the bottom boundary of the halftone pixels, while dots in halftone pixels 632b, 632d, 632f, and 632h extend downward from the top boundary of the halftone pixels. Referring to FIG. 6F, an example of a 3×3 array 650 of cells 652a–i containing halftone dot vectors 654a–i is shown. The halftone dot vectors 654a–i indicate: (1) the halftone pixel boundaries from which halftone dots 634a–i extend, and (2) the directions in which halftone dots 634a–i extend from such halftone pixel boundaries. As shown in FIG. 6F, halftone dot vectors sharing a common halftone pixel boundary extend in opposite directions from that boundary.

As a result, in this embodiment each dot in the halftone 630 extends in a direction that is opposite to the direction of extension of dots in horizontally- and vertically-adjacent halftone pixels. This results in vertically-adjacent pairs of dots which extend outward from a common halftone pixel boundary. For example, dot 634c and 634f extend outward from the common boundary 618 between halftone pixels 632c and 632f. Similarly, dots 634e and 634h extend outward from the common boundary 617 between halftone pixels 632e and 632h. Furthermore, the dots 634a–i in the halftone 630 are arranged in a 45-degree pattern, which has various advantages that are described in more detail below.

It should be appreciated that the vertically-adjacent dot pairs (such as the pair of dots 634c and 634f) may be rendered as individual marks using, e.g., a single heating element in a thermal-transfer printer. For example, because the dots 634c and 634f form an adjoining vertical dot pair, they may be printed as a single contiguous mark using, e.g., the heating element that is over the halftone pixels 632c and 632f while the output medium 304 passes under the heating element to form the shape made up of dots 634c and 634f.

It should be appreciated that although dot pairs (such as the dot pair consisting of dots 634c and 634f) may be printed as single marks, the size of each component dot of a dot pair is independently determined by the intensity of a corresponding region in the source image, such as a source image pixel. For example, the size of each of the dots 634c and 634f in the dot pair that they form is independently determined by the intensities of source image pixels 622c and 622f.

It should be appreciated that dot pairs need not be arranged in a 45-degree pattern, such as that shown in FIGS. 6B and 6D, but that other angles may also be used. For example, referring to FIG. 6E, in one embodiment of the present invention, dots are arranged in a 38-degree pattern to reduce the visibility of certain visual artifacts. A 3×3 halftone 640 includes halftone pixels 642a–i, which in turn contain dots 644a–i. The halftone 640 is compressed vertically (i.e., in the slow scan direction) compared to the halftones 610 (FIG. 6B) and 630 (FIG. 6D). As a result, the dots 644a–i are arranged in a 38-degree pattern. For example, dots 644g, 644e, and 644c form a line that is at a 38-degree angle to the horizontal axis of the halftone 640. Although the aspect ratio of the halftone 640 shown in FIG. 6E is different from that of the halftone 630 shown in FIG. 6D, techniques for resampling the source image to conform with the aspect ratio of the halftone 640 are well known to those of ordinary skill in the art.

Figure 7A:
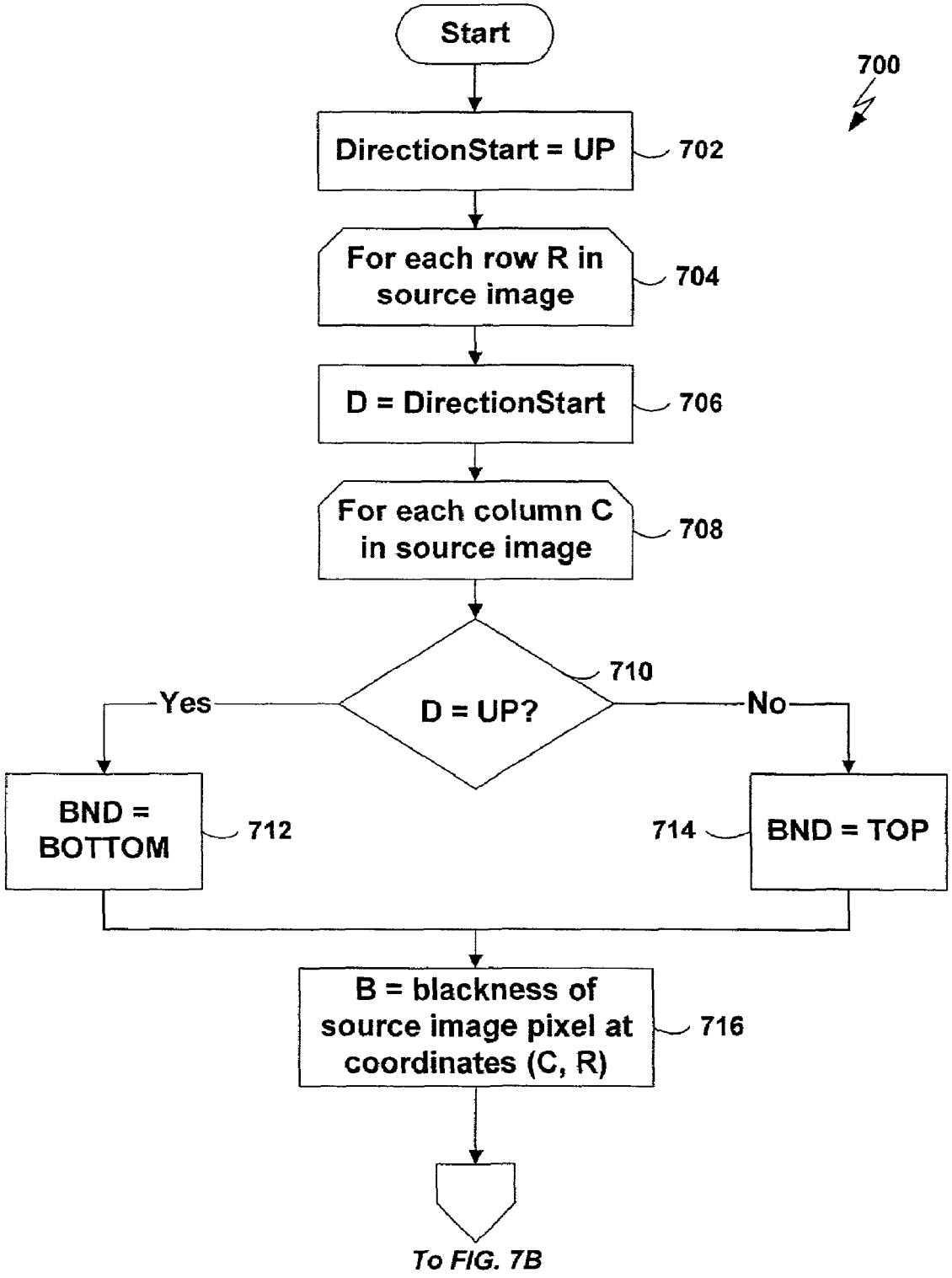
FIGS. 7A–7B are flow charts of a process that may be used to generate a digital halftone of a source image according to one embodiment of the present invention.
Figure 7B:
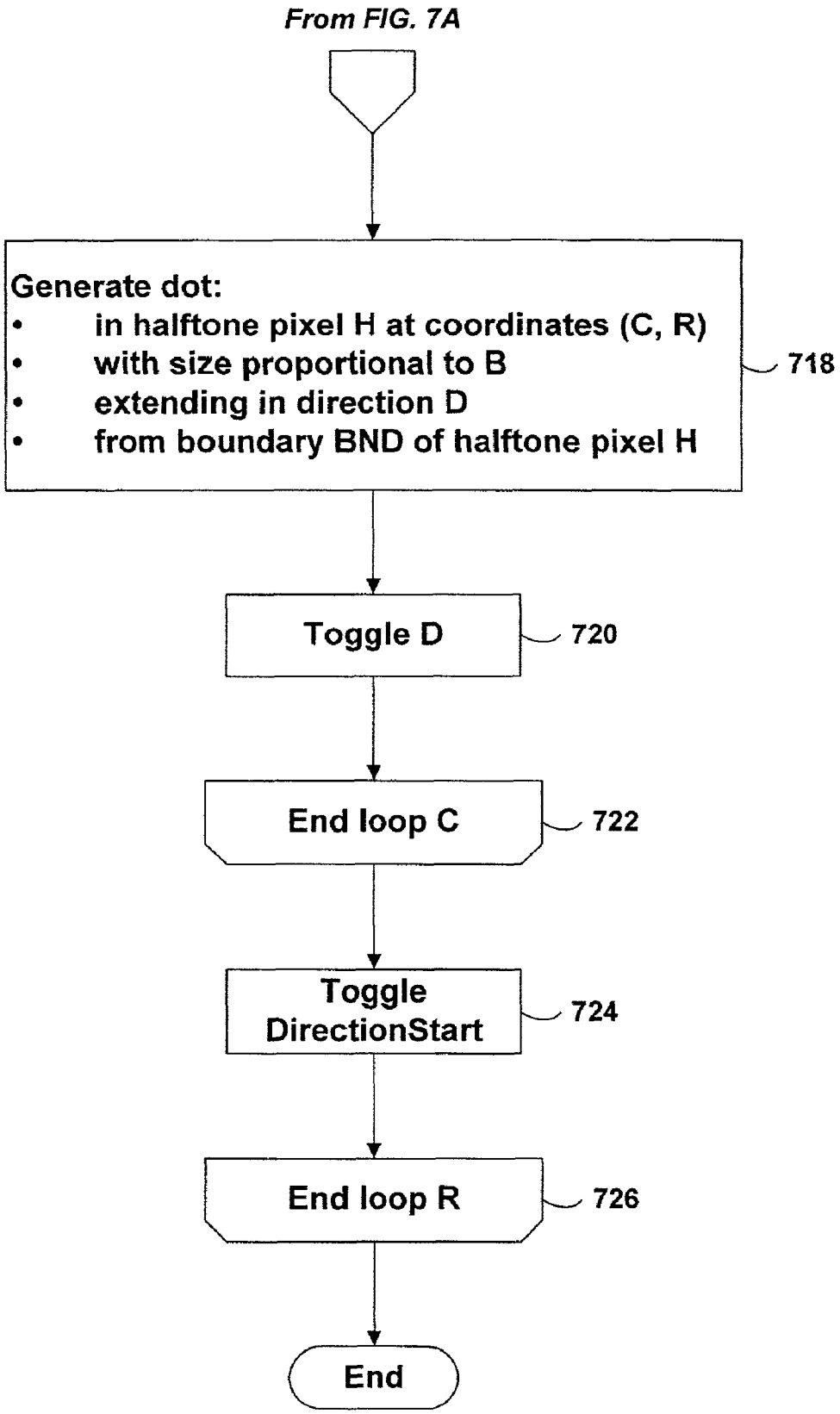

Referring to FIGS. 7A–7B, a flowchart of a process 700 that may be used to generate a digital halftone (such as the digital halftones 630 and 640) corresponding to a source image on an output medium according to one embodiment of the present invention is shown. In general, the process 700 generates dots corresponding to regions (e.g., individual pixels) in the source image. Dots are positioned within halftone pixels such that pairs of halftone dots contained within bordering halftone pixels extend in opposite directions from the halftone pixel boundaries of the halftone dots (as indicated by the vectors 654a–i shown in FIG. 6F). The size of each halftone dot generated by the method is proportional to the corresponding source image region.

A variable DirectionStart is used to keep track of the direction in which the first dot in the current row is to extend. The value of DirectionStart may either be UP, indicating that the current dot is to extend upward from the bottom of a halftone pixel boundary, or DOWN, indicating that the current dot is to extend downward from the top of the halftone pixel boundary. The process 700 initially assigns a value of UP to the variable DirectionStart (step 702), indicating that the first dot in the halftone is to extend upward from the bottom of the first halftone pixel boundary. This initial value is chosen arbitrarily, and may alternatively be a value of DOWN. It should be appreciated that the values UP and DOWN may correspond to any opposing directions and do not specify a particular orientation.

The process 700 enters into a loop over each row R in the source image (step 704). A variable D is used to keep track of the direction in which the current dot is to extend (either UP or DOWN). The variable D is assigned the current value of DirectionStart (step 706). The process 700 enters into an inner loop over each column C in the source image (step 708).

The process 700 is now ready to process the source image pixel at coordinates (C, R), where C is the current column and R is the current row. A variable BND is used to store an identifier of the boundary (either BOTTOM or TOP) of the current halftone pixel from which the current spot is to extend. If the value of D is equal to UP (step 710), a value of BOTTOM is assigned to BND (step 712). Otherwise, a value of TOP is assigned to BND (step 714).

The blackness of the source image pixel at coordinates (C, R) is stored in a variable B (step 716). The process 700 generates a dot: (1) in the halftone pixel H at coordinates (C, R), (2) having a size proportional to B, and (3) extending in direction D from boundary BND of halftone pixel H (step 718). For example, if the source image pixel at coordinates (0, 0) has a blackness of 128, then the process 700 generates a dot extending upward from the bottom of the halftone pixel at coordinates (0, 0) having a size that is proportional to 128.

To prepare for generating the next dot, the process 700 toggles the value of Direction (step 720). More specifically, if the value of Direction is UP, then Direction is assigned a value of DOWN. Similarly, if the value of direction is DOWN, then Direction is assigned a value of UP. This ensures that horizontally-adjacent dots extend in different directions. Steps 710–720 are repeated for the remaining columns in row R (step 722).

To prepare for generating the next row of dots, the process 700 toggles the value of DirectionStart (step 724). This ensures that vertically-adjacent dots extend in opposite directions from halftone pixel boundaries.

Steps 706–724 are repeated for the remaining rows in the source image (step 726).

It should be appreciated that the process shown in FIGS. 7A–7B is shown merely for purposes of example and does not constitute a limitation of the present invention. For example, the process 700 shown in FIGS. 7A–7B generates individual dots in both upward and downward directions. Those of ordinary skill in the art, however, will understand how to implement the process 700 to achieve the same result on an output device, such as a thermal printer, that renders dots only in a single direction and/or that renders multiple dots simultaneously. Furthermore, it should be appreciated that although the process 700 shown in FIGS. 7A–7B generates adjoining dots in a dot pair separately, other processes that generate a single dot representing a dot pair are also within the scope of the present invention.

The halftone generated by the process 700 may be rendered on an output medium either after the completion of the process 700 or as part of the process 700. As described in more detail below with respect to FIG. 8B, the halftone generated by the process 700 may be either a logical halftone or a physical halftone.

In the examples described above with respect to FIGS. 7A–7B, each dot in the halftone corresponds to a single source image pixel. This correspondence is used merely for purposes of example and does not constitute a limitation of the present invention. Rather, the source image 800 may be upsampled or downsampled by any factor prior to or during the halftoning process 802. As a result, there may be any numerical correspondence between dots in the halftone 804 and pixels in the source image 800, so long as dots in dot pairs extend from common halftone pixel boundaries. For example, in one embodiment, each pixel in the source image 800 corresponds to multiple dots in the halftone 804. In yet another embodiment, each dot in the halftone 804 corresponds to multiple pixels in the source image 800. These mappings may also be applied in any combination.

Figure 9A:
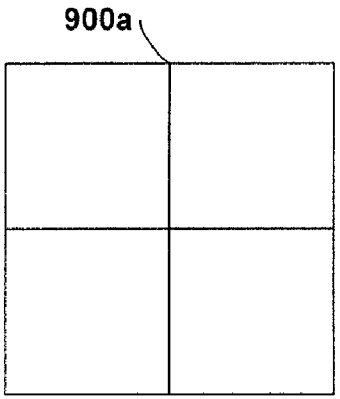
FIGS. 9A–9M are glyphs in a family of glyphs that is used to perform digital halftoning according to one embodiment of the present invention.
Figure 9B:
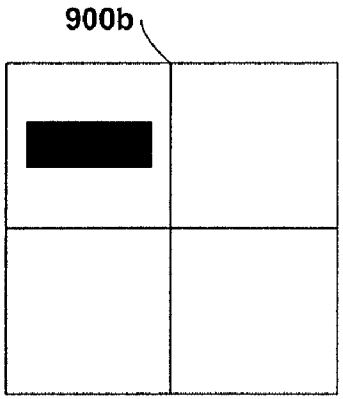
Figure 9C:
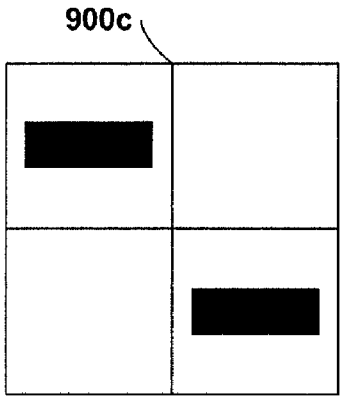
Figure 9D:
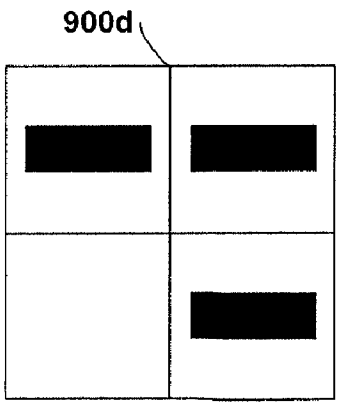
Figure 9E:
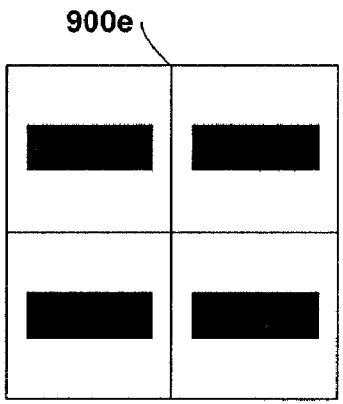
Figure 9F:
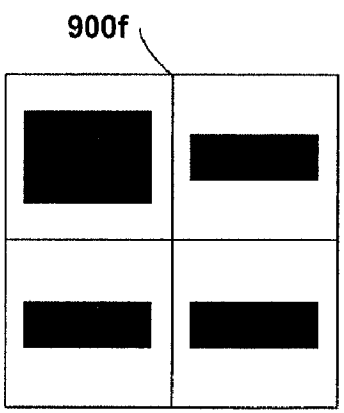
Figure 9G:
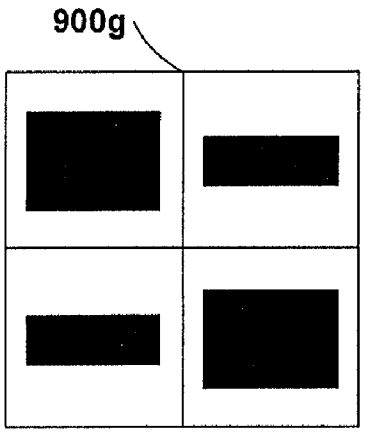
Figure 9H:
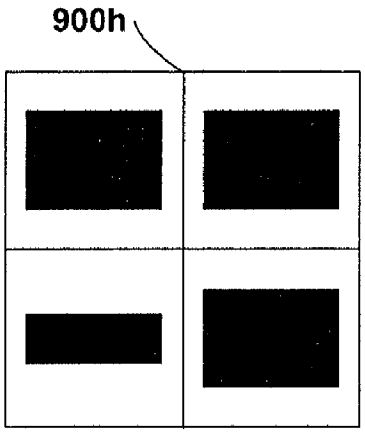
Figure 9I:
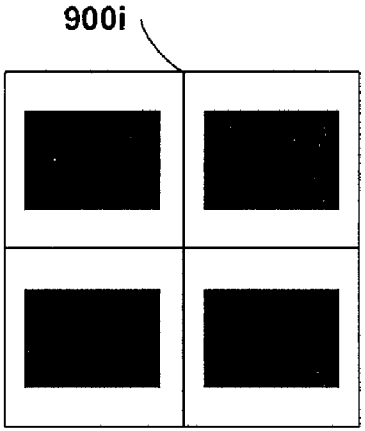
Figure 9J:
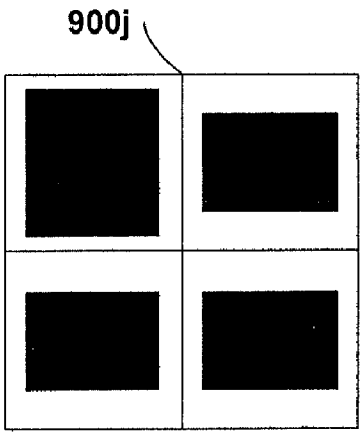
Figure 9K:
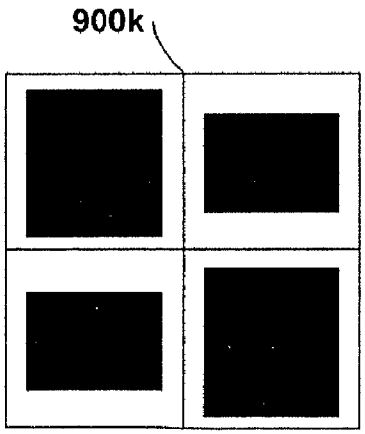
Figure 9L:
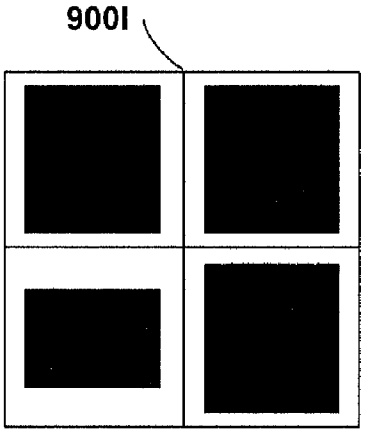
Figure 9M:
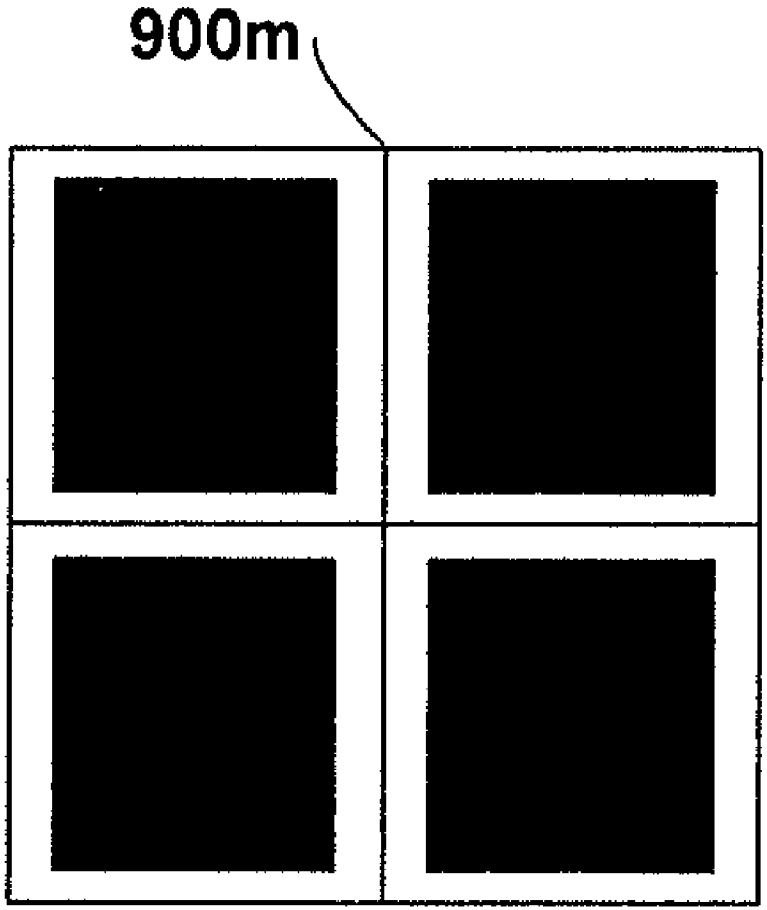

For example, in one embodiment of the present invention, glyphs are used to simulate a larger number of grayscale tones than can be simulated using individual dots. Referring to FIGS. 9A–9M, a family of thirteen glyphs 900a–m is shown that may be used to simulate thirteen shades of gray. Each of the glyphs 900a–m consists of a 2×2 array of pixels, each of which may contain a halftone dot. Referring to FIG. 9A, for example, glyph 900a contains no dots. In other words, glyph 900a contains four dots each of size zero. At each successive glyph in the family, the size of a single dot is increased, where the coordinates of the dot whose size is increased are chosen in a round-robin fashion. For example, moving from glyph 900a (FIG. 9A) to glyph 900b (FIG. 9B), the size of the upper-left dot is increased (from no dot to a small dot). Similarly, moving to glyph 900c (FIG. 9C), the size of the lower-right dot is increased (from no dot to a small dot). This pattern continues with the remaining glyphs, using four different dot sizes (counting a size of zero as a dot size). The result is the collection of thirteen glyphs 900a–m, which can be used to simulate thirteen different shades of gray.

It should be appreciated that the glyphs 900a–m are provided merely for purposes of illustration and do not constitute a limitation of the present invention. Furthermore, any family of glyphs may be used with various embodiments of the present invention.

To generate a halftone of a source image using the glyphs 900a–m, each region in the source image may be used to select one of the glyphs 900a–m. For example, consider a source image in which the blackness of each source image region ranges from 0–255. In one embodiment of the present invention, this range of blackness is subdivided into thirteen sub-ranges, and each of the glyphs 900a–m is assigned to one of the sub-ranges. To simulate a source image region, the glyph corresponding to the source image pixel's blackness is generated at corresponding coordinates in the halftone. Various other schemes may be used to simulate tones using these glyphs.

If the resolution of the output device is not sufficient to produce four dots for each source image pixel, various techniques may be used to generate halftones corresponding to the source image. For example, the source image may be downsampled, and the blackness of pixels in the downsampled source image may be used to select one of the glyphs 900a–m for use in the halftone, as described above. Although this technique allows source images to be printed on output devices that do not have a sufficiently high spatial resolution to print one glyph for each source image pixel, high-frequency detail is lost by downsampling the source image.

Figure 10:
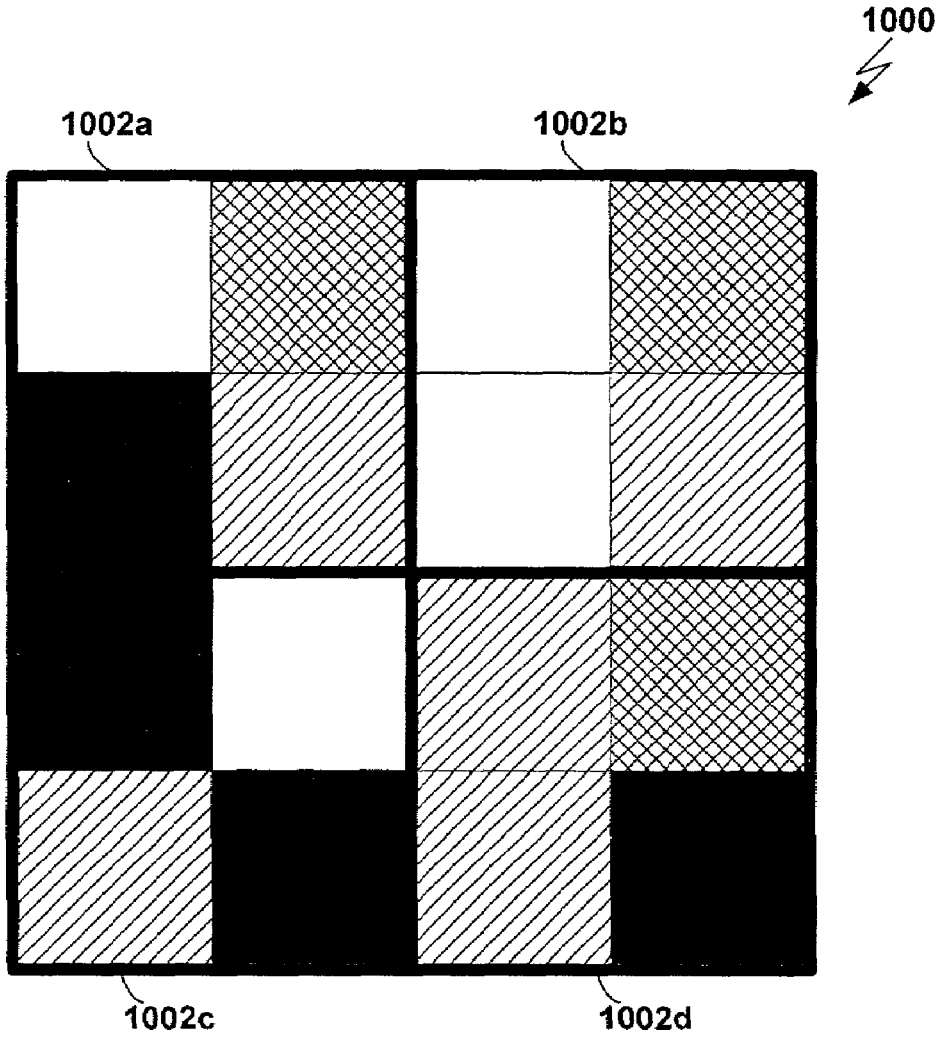
FIG. 10 is a block diagram of an 8-bit digital image that is logically subdivided into 2×2 subarrays of pixels.

In another embodiment of the present invention, a method that avoids downsampling is used to produce a halftone from a source image using the glyphs 900a–m. For example, referring to FIG. 10, a source image 1000 is shown that consists of a 4×4 array of source image pixels. The source image 1000 is further logically subdivided into 2×2 arrays 1002a–d of source image pixels, as indicated by thick lines in FIG. 10. As will become apparent from the description below with respect to FIG. 11, 2×2 arrays are chosen for purposes of example because in one embodiment of the present invention 2×2 glyphs are used to produce a halftone that simulates the source image 1000. It should be appreciated that the source image 1000 may, however, be subdivided into pixel arrays of any size. Furthermore, arbitrarily-sized source image regions may be used instead of individual source image pixels.

Figure 11:
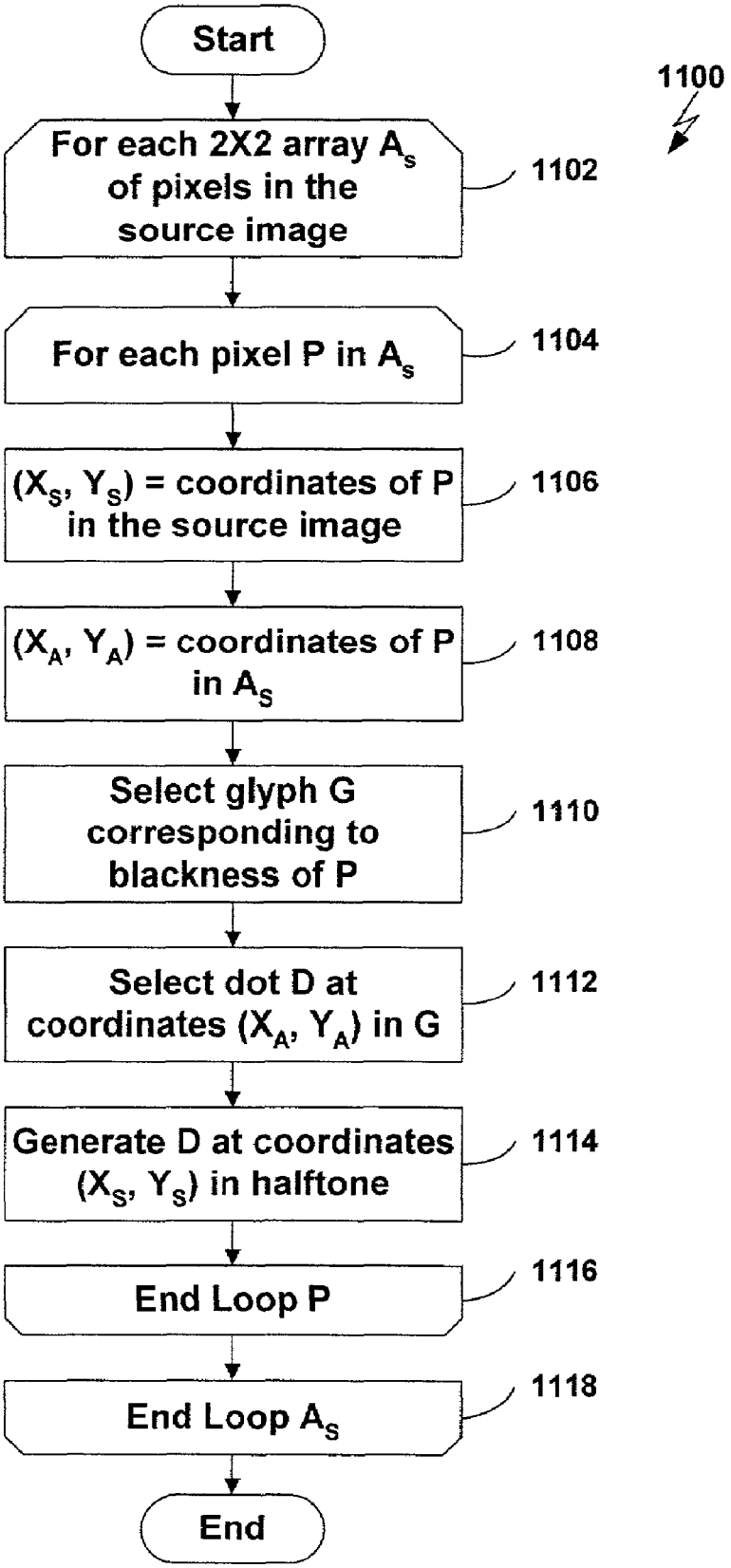
FIG. 11 is a flowchart of a method that is used to generate a halftone from a source image using glyphs according to one embodiment of the present invention.

Referring to FIG. 11, in one embodiment of the present invention, a process 1100 is used to produce a halftone that simulates the source image 1000. The process 1100 enters into a loop over each 2×2 array $A_s$ of source image pixels (step 1102). For example, the source image 1000 (FIG. 10) contains 2×2 arrays 1002a–d. The process 1100 enters into an inner loop over each pixel P in the current array $A_s$ (step 1104).

The variables $X_s$ and $Y_s$ are assigned the coordinates of the pixel P in the source image (step 1106). For example, the coordinates of the pixel in the upper-left corner of the source image 1000 are (0, 0), while the coordinates of the pixel in the lower-right corner of the source image 1000 are (3, 3). The variables $X_A$ and $Y_A$ are assigned the coordinates of the pixel P relative to the upper-left corner of the array AS (step 1108). For example, the pixel in the lower-right corner of the source image 1000 has ($X_A$, $Y_A$) coordinates (1, 1) relative to the upper-left corner of the array 1002d, and the pixel in the lower-left corner of the source image 1000 has coordinates (0, 1) relative to the upper-left corner of the array 1002c.

The glyph G corresponding to the blackness of pixel P is selected (step 1110). The glyph G may be selected in any of a variety of ways. For example, a family of glyphs (such as the family of glyphs 900a–m) may be pre-generated and stored in a lookup table. The blackness of pixel P may be used as an index in the lookup table to select the glyph G that corresponds to pixel P's blackness. The lookup table may, for example, represent each glyph as either: (1) a bitmap suitable for output on the output device 810, or (2) a pattern of halftone dots that is rasterized (converted into a bitmap) at a later stage. Alternatively, the glyph G may be generated on the fly by step 1110. For example, if the patterns in the family of glyphs are defined by a dither matrix, step 1110 may use the dither matrix to generate the appropriate glyph G based on the blackness of pixel P. These and other techniques for selecting the glyph G will be apparent to those of ordinary skill in the art.

The dot (or dot pattern) D at coordinates ($X_A$, $Y_A$) within glyph G is selected (step 1112). For example, if pixel P is in the lower-left hand corner of array $A_s$, then coordinates ($X_A$, $Y_A$) are (0, 1). In such a case, the dot at coordinates (0, 1) of the glyph G (i.e., the dot in its lower-left hand corner) would be selected as dot D in step 1112.

The dot D is generated (e.g., stored or rendered) at coordinates ($X_s$, $Y_s$) in the halftone (step 1114). It should be appreciated that various techniques described above with respect to the process 700 (FIGS. 7A–7B) may be used to generate the dot D such that it extends in an appropriate direction from an appropriate halftone pixel boundary according to the halftone dot vectors 654a–i (FIG. 6F). For example, in one embodiment of the present invention, dots are stored within pixels of the glyph G according to the halftone dot vectors of the array 650 (FIG. 6F). In other words, dots may be stored within the glyph G so that dots in adjacent pixels extend in opposite directions, as shown in FIG. 6F. In such an embodiment, when dot D is generated at coordinates ($X_s$, $Y_s$) in the halftone (step 1114) by copying dot D from the glyph G, the dot D is already positioned properly within the pixel P and therefore need not be shifted to be located in accordance with the array 650 (FIG. 6F).

Steps 1106–1114 are repeated for the remaining pixels in the array $A_s$ (step 1116). Steps 1104–1118 are repeated for the remaining pixel arrays in the source image 1000 (step 1118).

One advantage of using the process 1100 described above with respect to FIG. 11 is that it allows the simulation of a relatively large number of intensities, while still allowing individual source image pixels to specify the sizes of dots in the halftone. This enables a relatively large number of shades of gray to be simulated in the halftone, thereby producing more realistic halftones, while retaining high-frequency details compared to techniques that use the average intensity (or blackness) value of multiple source image pixels to generate dots or glyphs in the halftone.

Referring to FIG. 8A, in general, various embodiments of the present invention may be used to produce a halftone 804 from a source image 800 using a halftoning process 802. The halftoning process 802 receives the source image 800 as an input, processes the source image 800, and produces the halftone 804 as output. The source image 800 may, for example, be a continuous-tone image or a digital (discrete-tone) image acquired from any source. Furthermore, the source image 800 may undergo various preprocessing steps, such as color correction or color quantization, prior to being provided as an input to the halftoning process. The halftone 804 may be rendered on any output medium, such as plain paper or film. Furthermore, the halftone 804 may be digitally stored on any computer-readable medium such as a Random Access Memory (RAM), hard disk, floppy disk, or CD (such as a CD-ROM or CD-RW). As used herein, the term "generate" when applied to a halftone includes rendering the halftone on an output medium, storing the halftone on a computer-readable medium, or both.

Various embodiments of the present invention may be used in a variety of contexts. For example, referring to FIG. 8B, one example of a system 810 in which various embodiments of the present invention may be used is shown. An image acquisition device 812, such as a scanner, captures a source image 814 and provides the source image 814 to a computer 816 using a digital transport mechanism, such as a standard serial or parallel cable. The image acquisition device 812 may be any image acquisition device, such as a scanner or digital camera.

The computer 816 optionally stores the source image 814 in a computer-readable memory, such as a Random Access Memory (RAM) or a hard disk. The computer 816 may also perform additional processing on the source image 814, such as reducing or enlarging the size of the source image 814, applying filters to the source image 814, or modifying the spatial or intensity resolution of the source image 814. After performing any such processing, the computer 816 transmits the results as a logical halftone 818 to an output device 820 such as a thermal-transfer printer 820 using a digital transport mechanism. As used herein, the term "logical halftone" refers to a halftone that is stored on a computer-readable medium.

It should be appreciated that the output device 820 may be any output device, such as a thermal printer, laser printer, inkjet printer, or multi-function device. The output device 820 renders a physical halftone 822 based on the logical halftone 818 using any of the various techniques described herein on an output medium such as paper or film. As used herein, the term "physical halftone" refers to a halftone that has been rendered on an output medium.

Figure 8B:
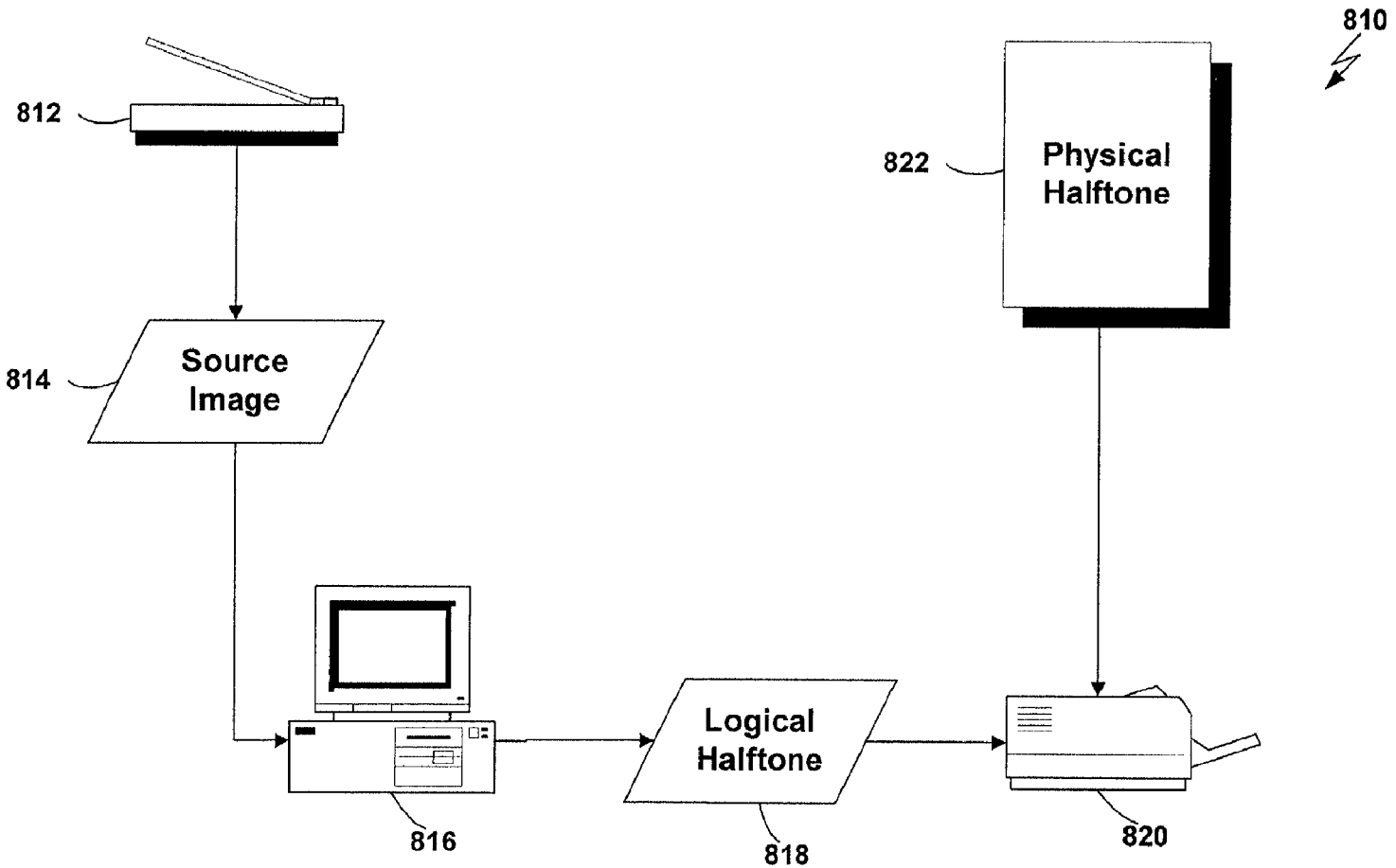
FIG. 8B is a block diagram of a halftoning system according to another embodiment of the present invention.

It should be appreciated that the system 810 shown in FIG. 8B is provided merely for purposes of example and does not constitute a limitation of the present invention. Rather, any appropriate system may be used to implement the techniques described herein. For example, features of the image acquisition device 812, the computer 816, and the output device 820, may be combined into a lesser number of devices or separated into a greater number of devices for performing the functions described above.

It should be appreciated that the various features of embodiments of the present invention described above and described in more detail below provide numerous advantages.

For example, in various embodiments of the present invention, individual pixels in the source image 800 contribute to (i.e., control the size of) individual dots in the halftone. This correspondence between individual source image pixels and halftone dots enables the halftone 804 to retain high-frequency details from the source image 800 while simulating a large number of gray levels, thereby resulting in more faithful reproduction of the source image 800.

Another advantage of various embodiments of the present invention is that by combining dots together to form dot pairs, each such dot pair may be rendered in the halftone 804 using a single contiguous mark. This can reduce the number of dots that are output in the halftone, thereby increasing the perimeter-to-area ratio of the dots. Reduction of this parameter can result in higher-quality dots because dots produced by various output devices tend to exhibit poorer quality at the perimeter than within the perimeter.

Various embodiments of the present invention also reduce the presence of certain visual artifacts that may be introduced by digital halftoning. For example, arranging dots at 45-degree angles (as shown in FIG. 6D), or at a 38-degree angle, as shown in FIG. 6E, reduces the visual impact of the patterns because the human eye is better able to perceive such patterns when they result from dots arranged in a grid whose rows and columns are arranged horizontally and vertically in the field of vision. Various embodiments of the present invention have the further advantage that they reduce visual artifacts while still substantially retaining fine (high spatial frequency details) from the source image 800, as described above.

The present invention has been described above in terms of various embodiments. Various other embodiments, including but not limited to the following, are also within the scope of the claims.

As described above, the term intensity typically refers to the amount of light reflected from within a particular region of an image. As used herein, the term intensity also refers to a value that may be used to represent a tone for a region. For example, an intensity may be a value representing a shade of gray in a grayscale image or a color in a color image. As described above, an intensity may be represented as a scalar value. For example, an intensity may be represented as an 8-bit scalar value having a range of 0–255. An intensity may also be represented, for example, as a floating point value having a range of 0–1.

The descriptions of various embodiments refer to halftone dots that "extend" from a halftone pixel boundary. As used herein, a halftone dot "extends" from a halftone pixel boundary if an edge of the dot abuts the halftone pixel boundary. For example, referring again to FIG. 6B, the halftone dot 614b extends downward from the top boundary of the halftone pixel 612b. It should be appreciated that the term "extend" does not specify that a halftone dot be rendered in any direction or in any particular manner. Rather, a halftone dot that extends from a halftone pixel boundary may be rendered on an output medium in any manner. For example, although the halftone dot 614c extends upward from the bottom boundary of the halftone pixel 612c, the dot within halftone pixel 612c may, but need not be, rendered downward toward the bottom boundary of the halftone pixel 612c.

Portions of the description above refer to dots that are "proportional" in size to the blackness of source image regions. It should be appreciated that such proportionality includes, but is not limited to, strict numerical proportionality. For example, in one embodiment of the present invention, there are n dot sizes $D_1$–$D_n$, and there are m levels of blackness $B_1$–$B_m$. For any two dots having dot sizes $D_A$ and $D_B$, corresponding to blacknesses $B_A$ and $B_B$, respectively, if $D_B>D_A$, then $B_B>B_A$. Various other mappings between levels of blackness and dot size are also within the scope of the present invention. Furthermore, as used herein, the term "dot size" includes, but is not limited to, measures of size such as area and length.

In general, the techniques described above may be implemented, for example, in hardware, software, firmware, or any combination thereof. The techniques described above may be implemented in one or more computer programs executing on a programmable computer and/or printer including a processor, a storage medium readable by the processor (including, for example, volatile and non-volatile memory and/or storage elements), at least one input device, and at least one output device. Program code may be applied to data entered using the input device to perform the functions described herein and to generate output information. The output information may be applied to one or more output devices.

Printers suitable for use with various embodiments of the present invention typically include a print engine and a printer controller. The printer controller receives print data from a host computer and generates page information, such as a logical halftone to be printed based on the print data. The printer controller transmits the page information to the print engine to be printed. The print engine performs the physical printing of the image specified by the page information on the output medium.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output.

It is to be understood that although the invention has been described above in terms of particular embodiments, the foregoing embodiments are provided as illustrative only, and do not limit or define the scope of the invention. Other embodiments are also within the scope of the present invention, which is defined by the scope of the claims below. Other embodiments that fall within the scope of the following claims includes include, but are not limited to, the following.

What is claimed is:

1. A method for generating a halftone of a source image, the halftone including halftone pixels, the halftone pixels being suitable for containing halftone dots, the method comprising [steps of]:

[(A)] selecting glyphs corresponding to regions in the source image, the regions having intensities, the glyphs including halftone dots;

[(B)] selecting, from among the halftone pixels, a first halftone pixel;

[(C)] selecting a first boundary of the first halftone pixel using a first boundary selection criterion that is dependent on a position of the first halftone pixel and independent of the intensity of the corresponding region;

[(D)] locating a first one of the halftone dots within the first halftone pixel so that the first halftone dot abuts the first pixel boundary;

[(E)] selecting, from among the halftone pixels, a second halftone pixel;

[(F)] selecting a second boundary of the second halftone pixel using a second boundary selection criterion that is dependent on a position of the second halftone pixel and independent of the intensity of the corresponding region; and

[(G)] locating a second one of the halftone dots within the second halftone pixel so that the second halftone dot abuts the second pixel boundary, wherein the first and second pixel boundaries are the same boundary.

2. The method of claim 1, further comprising [a step of]:

[(H)] rendering the halftone on an output medium using an output device.

3. The method of claim 2, wherein the output device comprises a thermal printer.

4. The method of claim 2, wherein the [step (H)] *rendering* comprises [a step of]:

[(H) (1)] rendering the first and second halftone dots as a single contiguous mark.

5. The method of claim 4, wherein the [step (H) (1)] *rendering the first and second halftone dots as a single contiguous mark* comprises [a step of] rendering the single contiguous mark using a print head element of a thermal printer.

6. The method of claim 1, wherein the source image comprises a digital image including a two-dimensional array of source image pixels, and wherein the regions in the source image comprise the source image pixels.

7. The method of claim 6, wherein each of the glyphs corresponds to a source image pixel.

8. The method of claim 1, wherein each of the glyphs comprises a two-dimensional array of halftone pixels.

9. The method of claim 8, wherein each of the glyphs comprises one halftone pixel.

10. The method of claim 9, wherein the size of a halftone dot contained within any one of the glyphs is inversely related to the intensity of the source image region that corresponds to the glyph.

11. The method of claim 1, wherein the first and second halftone dots are selected from one of the glyphs, and wherein the first and second halftone dots are in adjacent pixels within the selected glyph.

12. The method of claim 1, wherein the first and second pixel boundaries are perpendicular to a slow scan direction of an output device on which the halftone may be rendered.

13. The method of claim 1, wherein each of the halftone pixels has a top boundary and a bottom boundary, and wherein the method further comprises [a step of]:

[(E)] positioning a third one of the halftone dots within a third one of the halftone pixels that is adjacent to the first halftone pixel [by performing steps of:], *the positioning comprising:*

[(1)] if the first halftone dot abuts the top boundary of the first halftone pixel, positioning the third halftone dot to abut the bottom boundary of the third halftone pixel; and

[(2)] if the first halftone dot abuts the bottom boundary of the first halftone pixel, positioning the third halftone dot to abut the top boundary of the third halftone pixel.

14. The method of claim 13, wherein diagonally opposing corners of halftone pixels lie along a line at substantially a 45-degree angle to an axis of the halftone.

15. The method of claim 13, wherein diagonally opposing corners of halftone pixels lie along a line at substantially a 38-degree angle to an axis of the halftone.

16. The method of claim 1, wherein the [step (A)] *selecting glyphs* comprises [a step of]:

[(A) (1)] selecting glyphs corresponding to the intensities of the regions in the source image.

17. The method of claim 16, wherein [the step (A)] *selecting glyphs* further comprises [a step of]:

[(A) (2)] selecting halftone dots from the glyphs based on the coordinates of the source image regions.

18. The method of claim 1, wherein the first one of the halftone dots is contained within a first pixel of a [select] *selected* one of the glyphs, wherein the second one of the halftone dots is contained within a second pixel of the [select] *selected* one of the glyphs, and wherein:

the [step (D)] *locating the first one of the halftone dots* comprises locating the first one of the halftone dots within the first halftone pixel based on a location of the first one of the halftone dots within the first pixel of the [select] *selected* one of the glyphs; and wherein the [step (G)] *locating the second one of the halftone dots* comprises locating the second one of the halftone dots within the second halftone pixel based on a location of the second one of the halftone dots within the second pixel of the select one of the glyphs.

19. A method for generating a halftone of a digital source image including a two-dimensional array of source image pixels, the halftone including halftone pixels, the halftone pixels being suitable for containing halftone dots, the method comprising [steps of]:

[(A)] selecting halftone dots corresponding to source image pixels, the size of each of the halftone dots being inversely related to the intensity of one of the source image pixels;

[(B)] selecting, from among the halftone pixels, a first halftone pixel;

[(C)] selecting a first boundary of the first halftone pixel using a first boundary selection criterion that is dependent on a position of the first halftone pixel and independent of the intensity of the corresponding source image pixel;

[(D)] locating a first one of the halftone dots within the first halftone pixel so that the first halftone dot abuts the first pixel boundary;

[(E)] selecting, from among the halftone pixels, a second halftone pixel;

[(F)] selecting a second boundary of the second halftone pixel using a second boundary selection criterion that is dependent on a position of the second halftone pixel and independent of the intensity of the corresponding [region] *source image pixel*;

[(G)] locating a second one of the halftone dots within the second halftone pixel so that the second halftone dot abuts the second pixel boundary, wherein the first and second pixel boundaries are the same boundary and are perpendicular to a slow scan direction of an output device on which the halftone may be rendered; and

[(H)] rendering the halftone on an output medium using a thermal printer, wherein the [step of] rendering includes [a step of] rendering the first and second halftone dots as a single contiguous mark.

20. A method for generating a halftone of a digital source image including a two-dimensional array of source image pixels, the halftone including halftone pixels, the halftone pixels being suitable for containing halftone dots, the method comprising [steps of]:

[(A)] identifying intensities of the source image pixels;

[(B)] selecting glyphs corresponding to the identified intensities, the glyphs including halftone dots;

[(C)] selecting halftone dots from the glyphs based on the coordinates of the source image pixels;

[(D)] selecting, from among the halftone pixels, a first halftone pixel;

[(E)] selecting a first boundary of the first halftone pixel using a first boundary selection criterion that is dependent on a position of the first halftone pixel and independent of the intensity of the corresponding source image pixel;

[(F)] locating a first one of the halftone dots within the first halftone pixel so that the first halftone dot abuts the first pixel boundary;

[(G)] selecting, from among the halftone pixels, a second halftone pixel;

[(H)] selecting a second boundary of the second halftone pixel using a second boundary selection criterion that is dependent on a position of the second halftone pixel and independent of the intensity of the corresponding source image pixel;

[(I)] locating a second one of the halftone dots within the second halftone pixel so that the second halftone dot abuts the second pixel boundary, wherein the first and second pixel boundaries are the same boundary; and

[(J)] rendering the halftone on an output medium using a thermal printer, wherein the [step of] rendering includes [a step of] rendering the first and second halftone dots as a single contiguous mark.

21. A method for generating a halftone of a source image, the halftone including halftone pixels, the halftone pixels being suitable for containing halftone dots, each of the halftone pixels having a top boundary and a bottom boundary, the method comprising [steps of]:

[(A)] selecting glyphs corresponding to regions in the source image, the glyphs including halftone dots;

[(B)] selecting, from among the halftone pixels, a first halftone pixel and a second halftone pixel that share a pixel boundary;

[(C)] locating a first one of the halftone dots within the first halftone pixel so that the first halftone dot abuts the pixel boundary;

[(D)] locating a second one of the halftone dots within the second halftone pixel so that the second halftone dot abuts the pixel boundary;

[(E)] positioning a third one of the halftone dots within a third one of the halftone pixels that is adjacent to the first halftone pixel [by performing steps of:], *the positioning comprising:*

[(1)] if the first halftone dot abuts the top boundary of the first halftone pixel, positioning the third halftone dot to abut the bottom boundary of the third halftone pixel; and

[(2)] if the first halftone dot abuts the bottom boundary of the first halftone pixel, positioning the third halftone dot to abut the top boundary of the third halftone pixel.

22. The method of claim 21, wherein diagonally opposing corners of halftone pixels lie along a line at substantially a 45-degree angle to an axis of the halftone.

23. The method of claim 21, wherein diagonally opposing corners of halftone pixels lie along a line at substantially a 38-degree angle to an axis of the halftone.

*24. A non-transitory computer-readable medium comprising computer-readable instructions for generating a halftone of a source image, the halftone including halftone pixels, the halftone pixels being suitable for containing halftone dots, the computer-readable instructions comprising:*

*instructions to select glyphs corresponding to regions in the source image, the regions having intensities, the glyphs including halftone dots;*

*instructions to select, from among the halftone pixels, a first halftone pixel;*

*instructions to select a first boundary of the first halftone pixel using a first boundary selection criterion that is dependent on a position of the first halftone pixel and independent of the intensity of the conesponding region;*

*instructions to locate a first one of the halftone dots within the first halftone pixel so that the first halftone dot abuts the first pixel boundary;*

*instructions to select, from among the halftone pixels, a second halftone pixel;*

*instructions to select a second boundary of the second halftone pixel using a second boundary selection criterion that is dependent on a position of the second halftone pixel and independent of the intensity of the conesponding region; and*

*instructions to locate a second one of the halftone dots within the second halftone pixel so that the second halftone dot abuts the second pixel boundary, wherein the first and second pixel boundaries are the same boundary.*

*25. The computer readable medium of claim 24, the computer-readable instructions further comprising:*

*instructions to render the halftone on an output medium using an output device.*

*26. The computer readable medium of claim 25, wherein the output device comprises a thermal printer.*

*27. The computer readable medium of claim 25, wherein the instructions to render the halftone comprise:*

*instructions to render the first and second halftone dots as a single contiguous mark.*

*28. The computer readable medium of claim 27, wherein the instructions to render the first and second halftone dots comprise instructions to render the single contiguous mark using a print head element of a thermal printer.*

*29. The computer readable medium of claim 24, wherein the source image comprises a digital image including a two-dimensional array of source image pixels, and wherein the regions in the source image comprise the source image pixels.*

*30. The computer readable medium of claim 29, wherein each of the glyphs corresponds to a source image pixel.*

*31. The computer readable medium of claim 24, wherein each of the glyphs comprises a two-dimensional array of halftone pixels.*

*32. The computer readable medium of claim 31, wherein each of the glyphs comprises one halftone pixel.*

*33. The computer readable medium of claim 32, wherein the size of a halftone dot contained within any one of the glyphs is inversely related to the intensity of the source image region that corresponds to the glyph.*

*34. The computer readable medium of claim 24, wherein the first and second halftone dots are selected from one of the glyphs, and wherein the first and second halftone dots are in adjacent pixels within the selected glyph.*

*35. The computer readable medium of claim 24, wherein the first and second pixel boundaries are perpendicular to a slow scan direction of an output device on which the halftone may be rendered.*

*36. The computer readable medium of claim 24, wherein each of the halftone pixels has a top boundary and a bottom boundary, and wherein the computer-readable instructions further comprise:*

*instructions to position a third one of the halftone dots within a third one of the halftone pixels that is adjacent to the first halftone pixel, the instructions to position comprising:*

*position the third halftone dot to abut the bottom boundary of the third halftone pixel if the first halftone dot abuts the top boundary of the first halftone pixel; and*

*position the third halftone dot to abut the top boundary of the third halftone pixel if the first halftone dot abuts the bottom boundary of the first halftone pixel.*

*37. The computer readable medium of claim 36, wherein diagonally opposing corners of halftone pixels lie along a line at substantially a 45-degree angle to an axis of the halftone.*

*38. The computer readable medium of claim 36, wherein diagonally opposing corners of halftone pixels lie along a line at substantially a 38-degree angle to an axis of the halftone.*

*39. The computer readable medium of claim 24, wherein the instructions to select glyphs comprise:*

*instructions to select glyphs corresponding to the intensities of the regions in the source image.*

*40. The computer readable medium of claim 39, wherein the instructions to select glyphs corresponding to the intensities of the regions comprise:*

*instructions to select halftone dots from the glyphs based on the coordinates of the source image regions.*

*41. The computer readable medium of claim 24, wherein the first one of the halftone dots is contained within a first pixel of a selected one of the glyphs, wherein the second one of the halftone dots is contained within a second pixel of the selected one of the glyphs, and wherein:*

*the instructions to locate a first one of the halftone dots comprise instructions to locate the first one of the halftone dots within the first halftone pixel based on a location of the first one of the halftone dots within the first pixel of the selected one of the glyphs; and*

*wherein the instructions to locate a second one of the halftone dots comprise instructions to locate the second one of the halftone dots within the second halftone pixel based on a location of the second one of the halftone dots within the second pixel of the selected one of the glyphs.*

*42. A method for generating a halftone of a source image, the halftone including halftone pixels, the halftone pixels being suitable for containing halftone dots, the method comprising:*

*selecting glyphs corresponding to regions in the source image, the regions having intensities, the glyphs including halftone dots;*

*selecting, from among the halftone pixels, a first halftone pixel;*

*locating a first one of the halftone dots within the first halftone pixel so that the first halftone dot abuts a first pixel boundary, wherein the first pixel boundary is selected using a first boundary selection criterion that is dependent on a position of the first halftone pixel and independent of the intensity of the corresponding region;*

*selecting, from among the halftone pixels, a second halftone pixel; and*

*locating a second one of the halftone dots within the second halftone pixel so that the second halftone dot abuts a second pixel boundary, wherein the second pixel boundary is selected using a second boundary selection criterion that is dependent on a position of the second halftone pixel and independent of the intensity of the corresponding region, and wherein the first and second pixel boundaries are the same boundary.*

*43. A non-transitory computer-readable medium comprising computer-readable instructions for generating a halftone of a source image, the halftone including halftone pixels, the halftone pixels being suitable for containing halftone dots, the computer-readable instructions comprising:*

*instructions to select glyphs corresponding to regions in the source image, the regions having intensities, the glyphs including halftone dots;*

*instructions to select, from among the halftone pixels, a first halftone pixel;*

*instructions to locate a first one of the halftone dots within the first halftone pixel so that the first halftone dot abuts a first pixel boundary, wherein the first pixel boundary is selected using a first boundary selection criterion that is dependent on a position of the first halftone pixel and independent of the intensity of the corresponding region;*

*instructions to select, from among the halftone pixels, a second halftone pixel; and*

*instructions to locate a second one of the halftone dots within the second halftone pixel so that the second halftone dot abuts a second pixel boundary, wherein the second pixel boundary is selected using a second boundary selection criterion that is dependent on a position of the second halftone pixel and independent of the intensity of the corresponding region, and wherein the first and second pixel boundaries are the same boundary.*

*44. An output device for rendering a physical halftone on an output medium from a generated halftone of a source image, the halftone including halftone pixels, the halftone pixels being suitable for containing halftone dots, the output device comprising:*

*means for selecting glyphs corresponding to regions in the source image, the regions having intensities, the glyphs including halftone dots;*

*means for selecting, from among the halftone pixels, a first halftone pixel;*

*means for selecting a first boundary of the first halftone pixel using a first boundary selection criterion that is dependent on a position of the first halftone pixel and independent of the intensity of the corresponding region;*

*means for locating a first one of the halftone dots within the first halftone pixel so that the first halftone dot abuts a first pixel boundary;*

*means for selecting, from among the halftone pixels, a second halftone pixel;*

*means for selecting a second boundary of the second halftone pixel using a second boundary selection criterion that is dependent on a position of the second halftone pixel and independent of the intensity of the corresponding region; and*

*means for locating a second one of the halftone dots within the second halftone pixel so that the second halftone dot abuts a second pixel boundary, wherein the first and second pixel boundaries are the same boundary.*

*45. The output device of claim 44, further comprising a means for printing said first halftone pixel and said second halftone pixel on the output medium.*

*46. The output device of claim 44, wherein said output medium is paper or film.*

*47. An output device for rendering a halftone pixel on an output medium from a generated halftone of a source image, the halftone including halftone pixels, the halftone pixels being suitable for containing halftone dots, the output device comprising:*

*means for selecting glyphs corresponding to regions in the source image, the regions having intensities, the glyphs including halftone dots;*

*means for selecting, from among the halftone pixels, a first halftone pixel;*

*means for locating a first one of the halftone dots within the first halftone pixel so that the first halftone dot abuts a first pixel boundary, wherein the first pixel boundary is selected using a first boundary selection criterion that is dependent on a position of the first halftone pixel and independent of the intensity of the corresponding region;*

*means for selecting, from among the halftone pixels, a second halftone pixel; and*

*means for locating a second one of the halftone dots within the second halftone pixel so that the second halftone dot abuts a second pixel boundary, wherein the second pixel boundary is selected using a second boundary selection criterion that is dependent on a position of the second halftone pixel and independent of the intensity of the corresponding region, and wherein the first and second pixel boundaries are the same boundary.*

*48. The output device of claim 47, further comprising a means for printing said first halftone pixel and said second halftone pixel on the output medium.*

*49. The output device of claim 47, wherein said output medium is paper or film.*

* * * * *

UNITED STATES PATENT AND TRADEMARK OFFICE

CERTIFICATE OF CORRECTION

PATENT NO. : RE43,149 E
APPLICATION NO. : 12/031151
DATED : January 31, 2012
INVENTOR(S) : Bybell et al.

It is certified that error appears in the above-identified patent and that said Letters Patent is hereby corrected as shown below:

Column 23, line 60, in Claim 24, delete "*conesponding*" and insert -- *corresponding* --.

Column 24, lines 2-3, in Claim 24, delete "*conesponding*" and insert -- *corresponding* --.

Column 24, line 53, in Claim 36, delete "*position*" and insert -- *instructions to position* --.

Column 24, line 56, in Claim 36, delete "*position*" and insert -- *instructions to position* --.

Signed and Sealed this
Fourteenth Day of August, 2012

David J. Kappos

David J. Kappos
*Director of the United States Patent and Trademark Office*